United States Patent [19]
Tabata

[11] Patent Number: 6,111,597
[45] Date of Patent: Aug. 29, 2000

[54] STEREO IMAGE FORMING APPARATUS

[75] Inventor: Seiichiro Tabata, Hino, Japan

[73] Assignee: Olympus Optical Co., Ltd., Tokyo, Japan

[21] Appl. No.: 08/998,782

[22] Filed: Dec. 29, 1997

[30] Foreign Application Priority Data

Dec. 28, 1996 [JP] Japan .................................. 8-357800

[51] Int. Cl.[7] .................................................. H04N 13/00
[52] U.S. Cl. .................................. 348/43; 348/53; 345/8
[58] Field of Search .............................. 348/42, 43, 44, 348/46, 51, 52, 53, 56, 39, 115; 345/7, 8, 9, 136, 143, 418

[56] References Cited

U.S. PATENT DOCUMENTS

| | | | |
|---|---|---|---|
| 4,884,219 | 11/1989 | Walren | 348/53 |
| 5,579,026 | 11/1996 | Tabata | 345/8 |
| 5,726,670 | 3/1998 | Tabata et al. | 345/7 |
| 5,737,012 | 4/1998 | Tabata et al. | 348/53 |
| 5,742,264 | 4/1998 | Inagaki et al. | 345/9 |
| 5,781,165 | 7/1998 | Tabata | 345/8 |
| 5,790,184 | 8/1998 | Sato et al. | 348/42 |
| 5,825,456 | 10/1998 | Tabata et al. | 348/51 |
| 5,841,439 | 11/1998 | Pose et al. | 345/418 |

*Primary Examiner*—Chris S. Kelley
*Assistant Examiner*—Gims Philippe
*Attorney, Agent, or Firm*—Pillsbury Madison & Sutro, LLP

[57] ABSTRACT

Rendering is executed under conditions corresponding to the distance of a target object to obtain stereo display data, by preliminarily controlling its conditions such as the position or orientation of two-dimensional image projection planes (A mode). Alternatively, the rendering is executed independently of the distance of the target object, and data thus obtained is subjected to an image conversion process to obtain the stereo display data (B mode).

12 Claims, 30 Drawing Sheets

FIG. 20
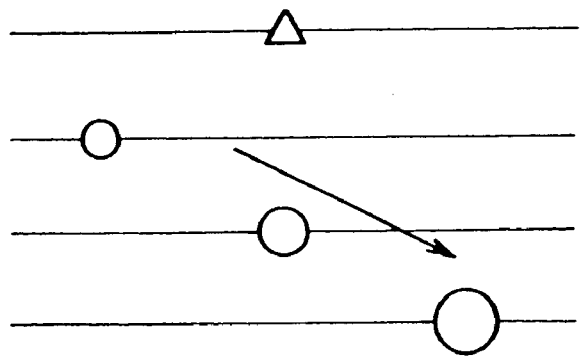
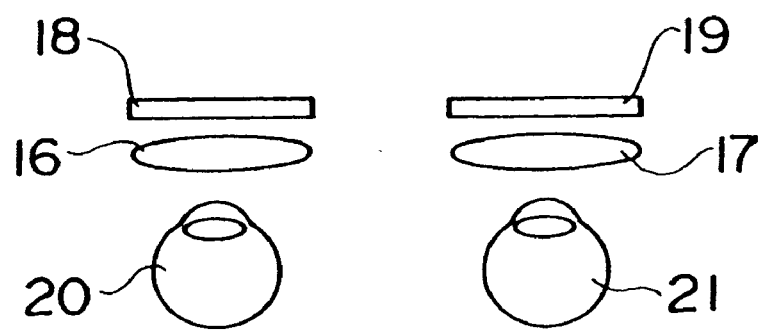

FIG. 21
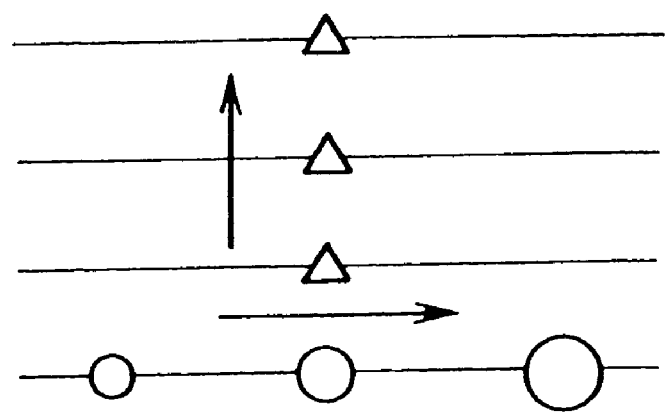
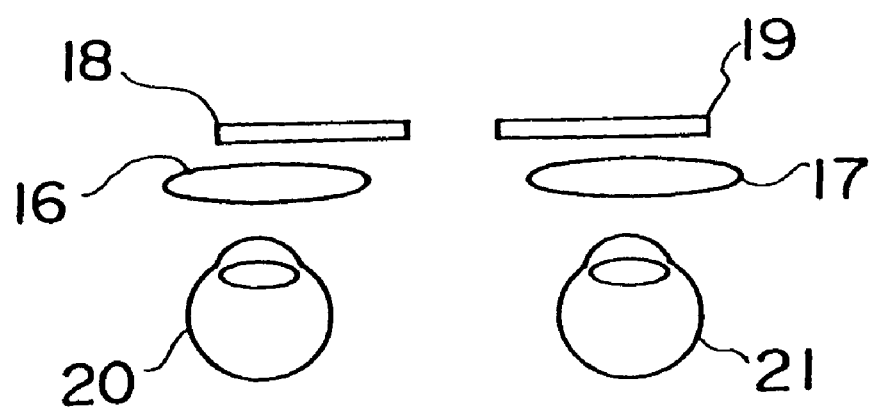

FIG. 38
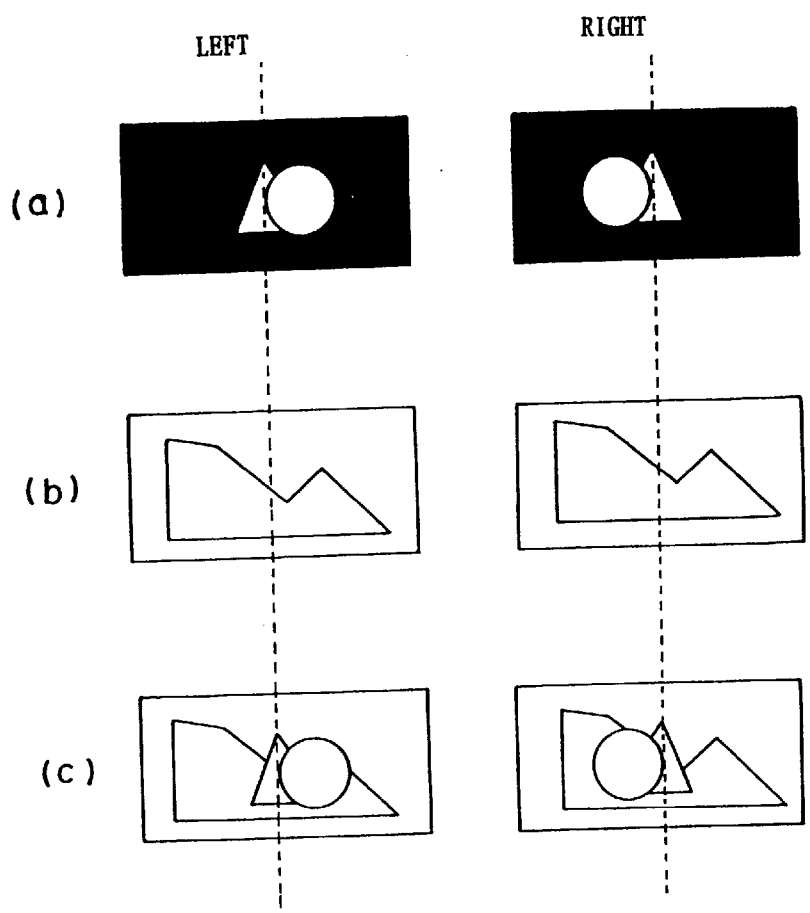
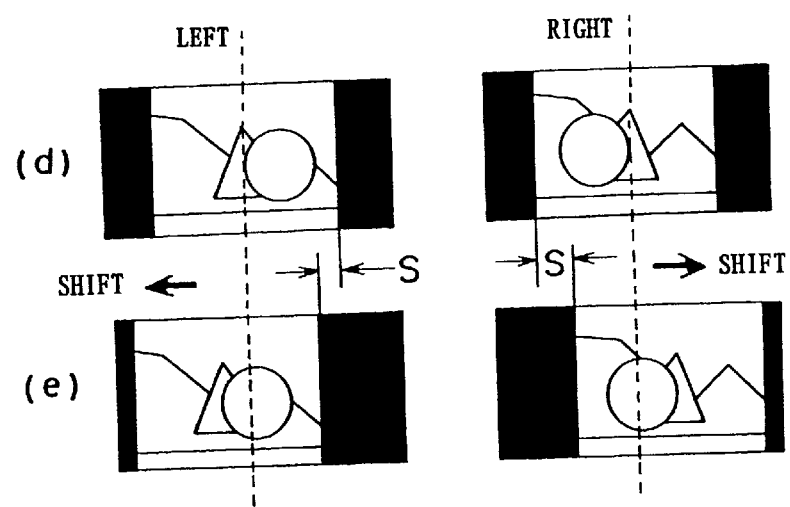

STEREO IMAGE FORMING APPARATUS

BACKGROUND OF THE INVENTION

The present invention relates to stereo image forming or generating apparatuses for viewing, on the basis of computer graphics or like techniques and with adequate image display means, a plurality of stereo-modeled objects in a virtual space where three-dimensional coordinates are set, and more particularly to an apparatus capable of viewing of a particular one of the plurality of objects by providing an adequate parallax and without feel of departure from natural sense of viewing or feel of fatigue.

Stereo image forming apparatuses, for viewing, on the basis of computer graphic (CG) or like techniques, a plurality of stereo-modeled objects, either statically or dynamically, in a virtual space where three-dimensional coordinates are set, are recently being developed, and various pertaining apparatuses have been proposed or manufactured.

However, such stereo image forming apparatuses, unlike apparatuses for merely obtaining stereo display images free from parallax between images for the left and right eyes, should form two different kinds of images with a binocular parallax therebetween. The formation of such images usually requires a long time until obtaining desired image data, or requires a high performance computer.

Japanese Laid-Open Patent Publication No. 07-230557 proposes a method for generating CG stereo-viewing animation, in which a stereo-viewing effect is provided by permitting the viewer's left and right eyes to view respectively formed images. In this method, CG images constituting a left eye and a right eye images are subjected to field-by-field rendering (which is an operation for making three-dimensional modeling inputted to a computer to be visible on a display, refer to "Three-Dimensional CG", edited by the Association of Television Engineers, issued by Ohm Co., Ltd.), thus reducing time necessary for the rendering.

In the meantime, the stereo image forming apparatus has a problem that, a feel of departure from natural sense of viewing and also a feel of fatigue are caused to the viewer by a departure from a relation, which is given between the focus on the eyes (or accommodation), i.e., the distance of an image formed on a display for viewing images for the left and right eyes, from the viewer's eyes and the vergence corresponding to the parallax between the two images (i.e., natural effort of concentrating the visual lines of the two eyes on an object to be viewed, see Shuya Koyanagi, "Dictionary of Optical Technology Words", issued by Opto-Electronics Co., Ltd.). The viewer's fatigue is also caused by frequent changes in the parallax concerning images or image portions under attention.

Japanese Laid-Open Patent Publication No. 07-167633 shows a stereo image pick-up/display apparatus, in which an image of an object, picked up in two different directions using two cameras, is recorded and reproduced for display with a fixed parallax concerning the image or image portion of the object under attention.

The above method of CG stereo-viewing animation generation disclosed in the Japanese Laid-Open Patent Publication No. 07-230557, suggests no consideration on reducing the feel of departure or feel of fatigue in the viewing of stereo-modeled objects in a virtual space.

The method of the field-by-field rendering of CG images constituting a left eye and a right eye images, is only disclosed, and no specific means to this end is disclosed.

The apparatus disclosed in the Japanese Laid-Open Patent Publication No. 07-167633, is constructed to determine, from the binocular parallax of image, an optimum visual point which permits the viewer to perceive the depth world of an object in the broadest range, and control the reproduction such that the position of the object is at a predetermined depth direction distance from the screen position of an image display. To achieve this control, a parallax map is obtained by the left and right eye images by computation using a correlation matching method. Then, a mean parallax value of image is obtained, or a factor-multiplied (weighted) mean parallax value is obtained by factor-multiplying (weighting) the screen center image. Using such mean parallax, parallax control means controls horizontal position read timing of data corresponding to the left and right eye images.

In this system, however, parallax maps of the entire screens are obtained by frame-by-frame computation. Therefore, the computation is complicated, and requires relatively ling time until obtaining the result, unless the system can be constructed by using a computer having particularly high performance.

SUMMARY OF THE INVENTION

The present invention was provided in view of the background as described above, and it has an object of providing a pertaining apparatus, which requires relatively short computation time, and hence permitting delay-free control of parallax or vergent distance, even in the case where a usual personal computer or the like is used to construct the system.

The features and advantages of the present invention are as follows:

According to a first aspect of the present invention, there is provided a stereo image forming apparatus for generating a first and a second piece of two-dimensional image data representing a first and a second two-dimensional image, respectively, of a plurality of stereo-modeled objects present in a virtual space, with three-dimensional coordinates set therein, by executing an operation corresponding to the projection of the objects on a first and a second predetermined projection plane from a first and second visual point at different coordinate positions in the virtual space with the three-dimensional coordinates set therein, comprising: particular object determining means for determining a particular object among the plurality of objects; and parallax control means for controlling the parallax of the first and second two-dimensional images concerning the particular object to be substantially constant.

In this first aspect of the present invention, the parallax concerning the particular object is controlled to be substantially constant.

According to a second aspect of the present invention, there is provided the stereo image forming apparatus according to the first aspect, wherein the particular object determining means includes visual direction detecting means for detecting a visual direction of a viewer viewing an image displayed on an image display and determines the particular object based on the detected output.

In the second aspect of the present invention, the particular one of a plurality of objects is determined on the basis of the viewer's visual direction as detected.

According to a third aspect of the present invention, there is provided the stereo image forming apparatus according to the first aspect, which further comprises a head-mounted stereo image display including a display element for the left eye, an optical system for the left eye, for viewing the screen of the display element for the left eye, a display element for the right eye, an optical system for the first eye, for viewing the screen of the right eye, and support means for supporting the display elements and optical systems in a predetermined position relationship to one another on the viewer's head, image data obtained in the parallax control means being supplied as data representing images to be displayed on the two screens of the head-mounted stereo image display.

In the third aspect of the present invention, the head-mounted stereo image display image display permits viewing the screens, which are always held at a constant distance from the viewer's eyeballs.

According to a fourth aspect of the present invention, there is provided the stereo image forming apparatus according to the first aspect, wherein the parallax control means includes visual line control means for controlling, prior to the execution of the operation corresponding to the projection in the stereo image forming apparatus, the distance of the point of intersection between a first visual line, connecting the first visual point and the screen center of the first display element, and a second visual line, connecting the second visual point and the screen center of the second display element, from the line connecting the first and second visual points according to an object distance, i.e., the distance of the particular object from the line connecting the first and second visual points.

In the fourth aspect of the present invention, the distance of the visual line intersection point can be controlled by a simple operation according to the object distance.

According to a fifth aspect of the present invention, there is provided the stereo image forming apparatus according to the fourth aspect, wherein the visual line control means controls the distance of the intersection points by turning the first projection plane about the first visual point and/or turning the second projection plane on the second visual point.

In the fifth aspect of the present invention, when applied to an apparatus where a projection plane is turned about the first visual point, the distance of the visual line intersection point can be controlled in the same manner as the usual visual line shifting process.

According to a sixth aspect of the present invention, there is provided the stereo image forming apparatus according to the fourth aspect, wherein the visual line control means controls the distance of the intersection point by inwardly shifting the first projection plane and/or the second projection plane.

In the sixth aspect of the present invention, the visual line intersection point is controlled in a simple process of shifting a projection plane in one direction.

According to a seventh aspect of the present invention, there is provided the stereo image forming apparatus according to the first aspect, which further comprises: synthesis object image forming means for forming a third two-dimensional image to be combined with the first two-dimensional image and a fourth two-dimensional image to be combined with the second two-dimensional image, on the basis of a predetermined the same two-dimensional image data by incorporating a parallax controlled by the parallax control means with respect to the same two-dimensional image data; first image synthesizing means for generating two-dimensional image data representing a resultant two-dimensional image of the first and third two-dimensional images; and second image synthesizing means for generating two-dimensional data representing another resultant two-dimensional image of the second and fourth two-dimensional images.

In the seventh aspect of the present invention, in a case of synthesizing a stereo image from an image under attention and a background image, the depth direction position relation between the image under attention and the background image can be adequately determined on the basis of the parallax controlled by the parallax control means.

According to an eighth aspect of the present invention, there is provided the stereo image forming apparatus according to the fourth aspect, wherein: the visual line control means controls the distance of the intersection point to make the intersection point distance and the object distance equal to each other, thereby obtaining distance-controlled image data, and further comprises: stereo image display means for controlling the horizontal direction position relation between the two-dimensional images such as to reduce the parallax concerning the particular object to be zero, the stereo image display means including a left eye optical system for viewing of a left eye screen and a right eye optical system for viewing of a right eye screen, and being constructed such that the point of intersection between optical visual lines passing through the principal points of lenses of the optical systems and the centers of the screens, respectively, is in a virtual image plane provided by the optical systems, image data obtained in the two-dimensional image data control means being supplied as data representing images to be displayed on the screens, respectively, of the stereo image display means.

In the eighth aspect of the present invention, an image display, in which the position of the visual line intersection point due to the vergence of the viewer's eyes and the position of the virtual image plane of the object under attention are coincident so that it can be viewed with less feel of departure from natural sense of viewing and also less feel of fatigue, can be obtained so long as image data controlled such that the parallax is zero are supplied to stereo image display means.

According to a ninth aspect of the present invention, there is provided the stereo image forming apparatus according to the first aspect, wherein the visual line control means includes two-dimensional image data control means for obtaining two-dimensional image data by controlling, after execution of the operation corresponding to the projection in the stereo image forming apparatus, the horizontal direction position relation between a two-dimensional image displayed on a predetermined first image display area in stereo image display means and a two-dimensional image displayed on a predetermined second image display area in the stereo image display means on the basis of an object distance from the particular object to a line connecting the first and second visual points.

In the ninth aspect of the present invention, computation for determining the particular object and computation for parallax control can be executed concurrently on a time division basis or the like, after execution of the operation corresponding to the projection in the stereo image forming apparatus.

According to a tenth aspect of the present invention, there is provided the stereo image forming apparatus according to the ninth aspect, wherein two-dimensional image data control means further includes stereo image display means for controlling the horizontal direction position relation between the two-dimensional images such as to reduce the parallax concerning the particular object to be zero, the stereo image display means including a left eye optical system for viewing of a left eye screen and a right eye optical system for viewing of a right eye screen, and being constructed such that the point of intersection between optical visual lines passing through the principal points of lenses of the optical systems and the centers of the screens, respectively, is in a virtual image plane provided by the optical systems, image data obtained in the two-dimensional image data control means being supplied as data representing images to be displayed on the screens, respectively, of the stereo image display means.

In the tenth aspect of the present invention, an image display, in which the position of the visual line intersection point due to the vergence of the viewer's eyes and the position of the virtual image plane so that it can be viewed with less feel of departure from natural sense of viewing and also less feel of fatigue, can be obtained so long as image data, controlled by the two-dimensional image data control means such that the parallax is zero, are supplied to the stereo image display means.

According to an eleventh aspect of the present invention, there is provided a stereo image forming apparatus comprising: stereo image data generating means for generating data representing a plurality of objects with different parallaxes; particular object determining means for determining a particular object among the plurality of objects; parallax control means for image data such that the parallax of the entirety of the stereo image is controlled to make the parallax of the particular object to be zero; and stereo image display means including a left eye optical system for viewing a left eye screen and a right eye optical system for viewing a right eye screen, the stereo image display means being constructed such that the point of intersection between visual lines passing through the principal points of lenses of the optical systems and the centers of the screens, respectively, is in a virtual image plane provided by the optical systems, image data obtained in the parallax control means being supplied as data representing images to be displayed on both the screens, respectiveluy.

According to a twelfth aspect of the present invention, there is provided a stereo image forming apparatus comprising stereo image data generating means for generating data representing a plurality of objects with different parallaxes; particular object determining means for determining a particular object among the plurality of objects; parallax control means for image data such that the parallax of the entirety of the stereo image is controlled to make the parallax of the particular object to be zero; stereo image display means including a left eye optical system for viewing a left eye screen and a right eye optical system for viewing a right eye screen; and stereo image display means in which image data obtained in the parallax control means is supplied as data representing images to be displayed on the screens, respectively, and the center positions of effective display areas of the screens are controlled such that the point of intersection between visual lines concerning the optical systems is in a virtual image plane provided by the optical systems.

In the eleventh and twelfth aspects of the present invention, image data of the particular object, having been controlled such that the parallax is zero, are supplied to the stereo image display means, and it is possible, concerning the particular object, to obtain an image display, in which the position of the visual eye intersection point due to the vergence of the viewer's eyes and the position of the virtual image plane of the object under attention are coincident so that it can be viewed with less feel of departure from natural sense of viewing and also less feel of fatigue.

According to a thirteenth aspect of the present invention, there is provided a distance determining system comprising: visual direction detecting means for detecting the visual direction of a viewer viewing an image displayed on an image display: plural direction angle determining means for determining a plurality of angles concerning the visual directions according to a detection output from the visual direction detecting means; object determining means for determining objects on lines at the plurality of angles determined by the plurality direction angle determining means; and distance determining means for determining the depth direction distances of the objects determined by the object determining means.

In the thirteenth aspect of the present invention, objects on lines at a plurality of angles are determined, and the depth direction distances of the determined objects are determined. It is thus possible to evade erroneous recognition concerning object determination due to visual line fluctuations such as normally occurring involuntary eye movement of human's eyes.

According to a fourteenth aspect of the present invention, there is provided the distance determining system according to the thirteenth aspect, wherein the plural direction angle determining means determines a plurality of visual angles corresponding to different time instants according to a plurality of detection outputs obtained at the different time instants in the visual direction determining means as a result of recurrent execution of a visual direction detecting operation a plurality of times in a predetermined time period; and the object determining means determines objects on lines at the visual angles corresponding to the different time instants.

In the fourteenth aspect of the present invention, it is possible to know a region of visual line fluctuations such as normally occurring involuntary eye movement or saccadic movement of human's eyes, and objects in such region can be accurately identified as such.

According to a fifteenth aspect of the present invention, there is provided the distance determining system according to the thirteenth aspect, wherein the plural direction angle determining means determines a plurality of visual angles in a predetermined angle coverage centered on a visual direction corresponding to a detection output of the visual direction determining means; and the object determining means determines objects on lines at the plurality of visual angles.

In the fifteenth aspect of the present invention, objects in a plurality of visual directions can be determined in a single operation, and the process speed thus can be increased.

According to a sixteenth aspect of the present invention, there is provided the distance determining system according to the thirteenth aspect, wherein the depth direction distance determining means determines the depth direction distance of the most frequently occurring one of the objects determined by the object determining means.

In the sixteenth aspect of the present invention, the depth direction distance of the most frequently occurring object can be determined, so that it is possible to evade erroneous detection. According to a seventeenth aspect of the present invention, there is provided the distance determining system according to the thirteenth aspect, wherein the depth direction determining means determines the depth direction distances of the objects determined by the object determining means, and determines the least one of the determined depth direction distances.

In the seventeenth aspect of the present invention, erroneous object detection due to normally occurring involuntary eye movement or saccadic movement of human's eyes, can be evaded even when the viewer is viewing the boundary of an object.

According to an eighteenth aspect of the present invention, there is provided the distance determining system according to the thirteenth aspect, wherein the depth direction distance determining means includes operational means for determining the depth direction distances of the objects determined by the object determining means, them obtaining the inverses to the determined depth direction distances, then obtaining the average of the obtained inverses, and then obtaining the inverse to the obtained average.

In the eighteenth aspect of the present invention, the mean depth direction distance of a plurality of objects can be accurately determined, even when among these objects are those at infinite depth direction distance.

Other objects and features will be clarified from the following description with reference to attached drawings.

BRIEF DESCRIPTION OF THE DRAWINGS

FIG. 20 is a schematic view showing a three-dimensional space image, which is formed when the left and right images are displayed on the screens of the left and right display elements 18 and 19 in the case of using a usual image display;

FIG. 21 is a schematic view showing a three-dimensional space image, which is formed when the left and right images are displayed on the screens of the left and right display elements 18 and 19 in the case of using the image display according to the present invention;

FIG. 38 is a schematic view showing a different manner of combining background images with a suitable fixed parallax in the left and right images, for forming a stereo image in the apparatus according to the present invention.

PREFERRED EMBODIMENTS OF THE INVENTION

Figure 1:
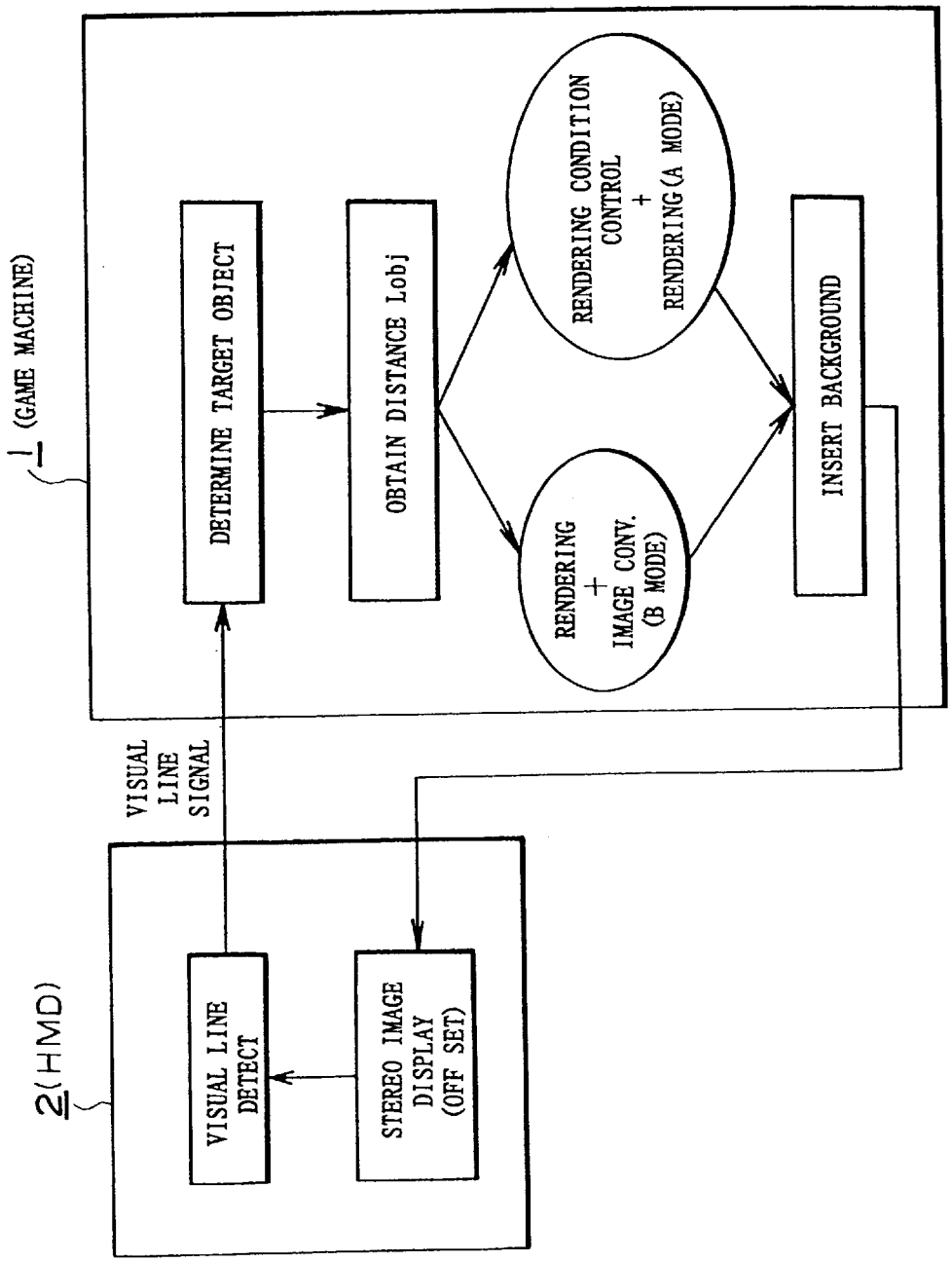
FIG. 1 is a block diagram illustrating a basic concept underlying the present invention.

Preferred embodiments of the present invention will now be described with reference to the drawings. FIG. 1 is a block diagram illustrating a basic concept underlying the present invention.

A stereo image forming device (for example, a game machine) 1 and a head-mounted display (hereinafter abbreviated as HMD) 2 which serves as an image display, are interconnected by a cable. The stereo image forming device 1 receives a visual direction signal, which is generated by visual direction detecting means in the HMD 2.

The stereo image forming device 1 determines an image under attention, as a specific object or target object, according to the visual direction signal, and computes the distance Lobj of the target object thus determined by executing an operation to be described later.

According to the present invention, a process called rendering is executed, under conditions corresponding to the distance Lobj of the target object, to obtain image data thereof, for projecting two images of the object on corresponding two-dimensional image projection planes, respectively, the projected images being viewed in a virtual three-dimensional space with the two eyes. In one mode of the present invention, conditions under which to execute the rendering, such as the position or orientation of the two-dimensional image projection planes, are set in correspondence to the distance of the target object, before execution of the rendering to obtain stereo display data (A mode).

In an alternate mode of the present invention, data obtained by executing the rendering independently of the distance Lobj of the target object, is used in an image conversion process to obtain the stereo display data (B mode).

The stereo image forming device 1 executes a process of inserting, in the object image data obtained in the above A or B mode, background image data concerning the background of the object (the process being hereinafter referred to as background insertion process), and supplies the data obtained as a result of this process to the HMD 2. In the HMD 2, a stereo image display displays images (on the screens of a left and a right image display elements) according to the supplied object and background image data.

According to the present invention, the display positions of the left and right images are given off-sets to make equal the visual distance and the vergent distance of displayed objects.

Figure 2:
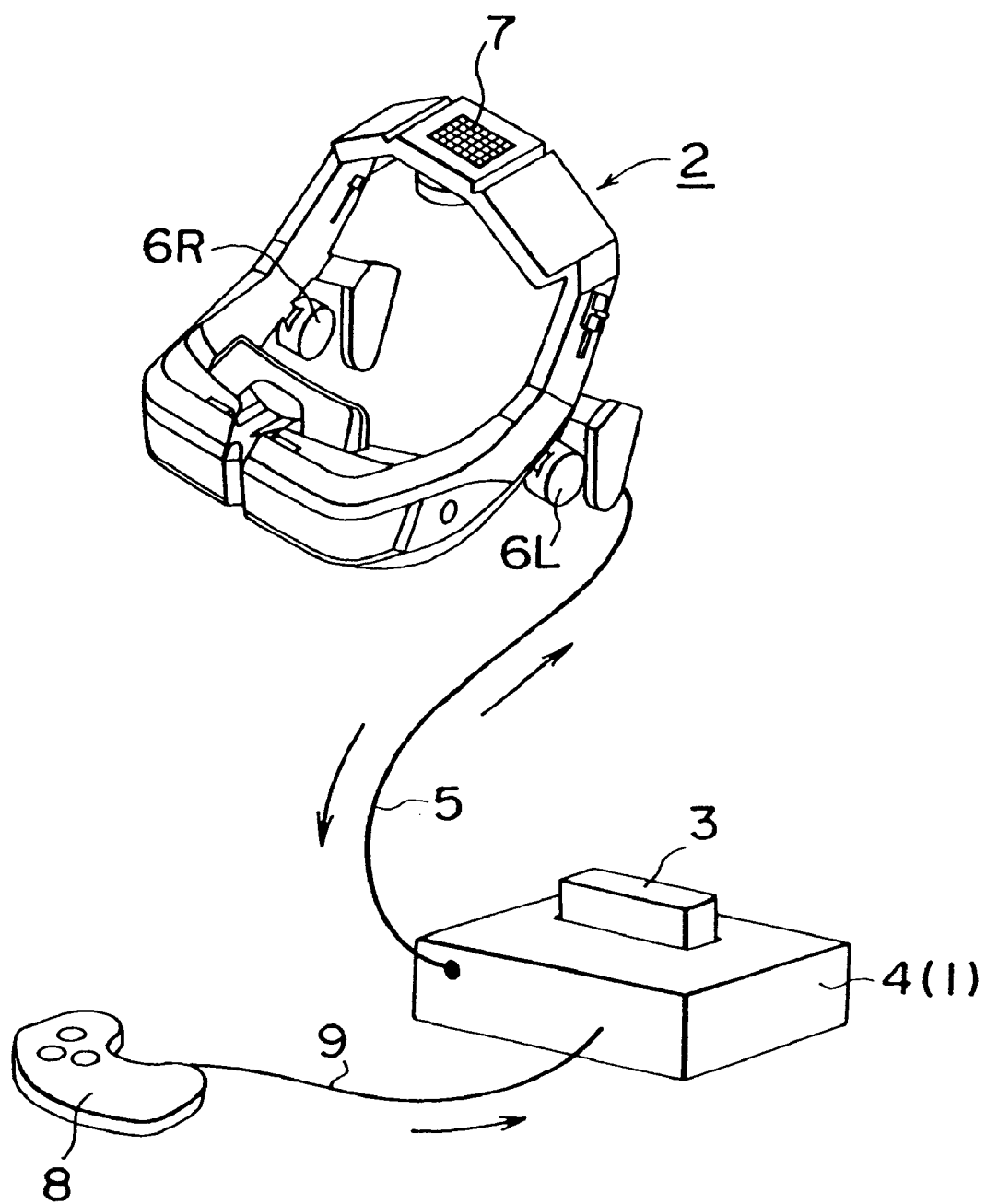
FIG. 2 is a view showing a stereo image display in an embodiment of the present invention adopting the HMD 2.

FIG. 2 is a view showing a three-dimensional or stereo image display in an embodiment of the present invention adopting the HMD 2.

A stereo image forming device 4 (i.e., game machine 1) is interconnected through a cable 5 with the HMD 2 for data transfer and power reception. The stereo image forming device 4 comprises a micro-computer as a main element. A program recording medium 3, such as a card memory, with an application program stored therein, can be loaded in the stereo image forming device 4. Using data stored in the program recording medium 3, the stereo image forming device 4 executes a process of generating two pieces of two-dimensional image data, which are necessary for stereo viewing of a plurality of stereo-modeled objects in a virtual space, with three-dimensional space coordinates set therein, as will be described later with reference to FIG. 3.

The stereo image forming device 4 supplies left and right image data, left and right sound data, liquid crystal drive signal, operating power, etc. through the cable 5 to the HMD 2.

Images which are represented by the left and right image data are displayed on the display screens of a left and a right liquid crystal display elements in the HMD 2. Also, according to the left and right sound data, stereo sounds are outputted form a left and a right loudspeakers 6L and 6R in the HMD 2.

According to a liquid crystal drive signal, one of two modes are selectively exchanged between an image display mode in which the left and right liquid shutter function of the HMD 2 is made to be opaque state, and a see-through mode in which the liquid crystal shutter is made to be transparent.

From the HMD 2, a visual direction signal from visual direction detector, to be described later, and a head motion signal of a head motion sensor 7 which detects motion (or posture) of the viewer's head bearing the HMD 2, are supplied to the stereo image forming device 4.

A game controller 8 is connected by a cable 9 to the stereo image forming device 4, and supplies various operating signals thereto.

Figure 3:
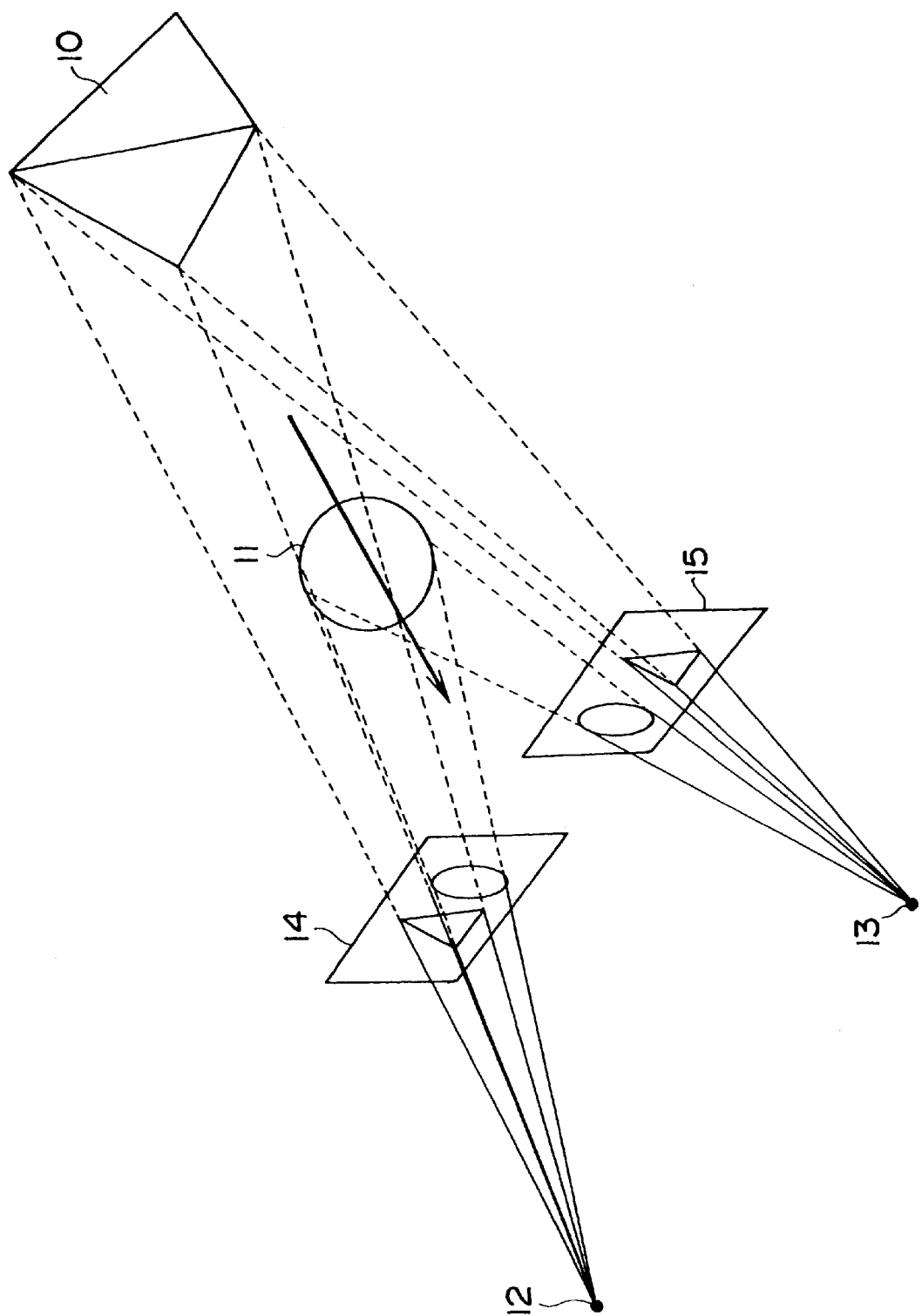
FIG. 3 is a schematic view illustrating the process of generating two pieces of two-dimensional image data, necessary for stereo viewing of a plurality of stereo-modeled objects in a virtual space with three-dimensional space coordinates set therein.

FIG. 3 is a schematic view illustrating the process of generating two pieces of two-dimensional image data, necessary for stereo viewing of a plurality of stereo-modeled objects in a virtual space with three-dimensional space coordinates set therein.

Referring to the Figure, a triangular pyramid body 10 and a spherical body 11 are depicted as stereo-modeled objects in a virtual space (which is represented by the entire illustrated area), in which the three-dimensional coordinates (not shown) are set. An operation is executed for projecting the images of the objects from a left and a right visual points 12 and 13, as a first and a second 9 visual point which are in different three-dimensional coordinates, onto a left and a right projection planes 14 and 15, as a first and a second projection plane, respectively. The operation is executed by a pertinent functional part mainly comprising a computer in the stereo image forming device, whereby a first and a second piece of two-dimensional image data, representing a first and a second two-dimensional images, respectively, are generated.

Commonly termed three-dimensional CG images are image projection viewed from a single visual point. According to the present invention, on the other hand, a stereo image is formed by the two pieces of two-dimensional image data corresponding to the two visual points, as described above in connection with FIG. 3.

Figure 4:
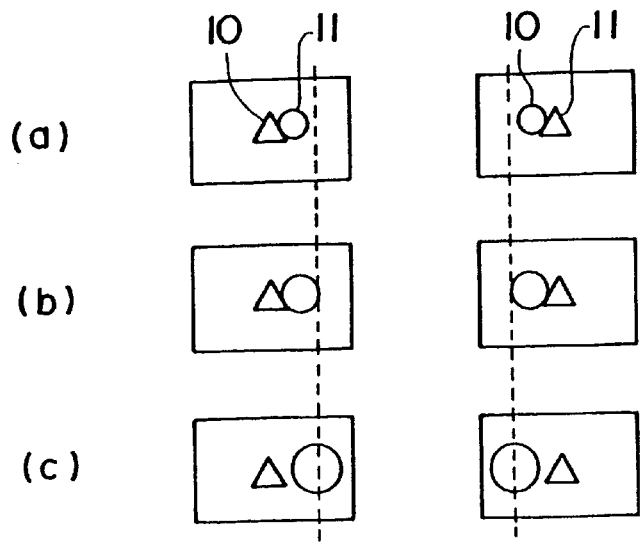
FIG. 4 shows how the display positions of the left and right images, which are to be viewed together as a stereo image, undergo depth direction motions in virtual three-dimensional space with relative motions of two display objects.

FIG. 4 shows how the display positions of the left and right images, which are to be viewed together as a stereo image, undergo depth direction motions in virtual three-dimensional space with relative motions of two display objects (i.e., a triangular pyramid body 10 and a spherical body 11). In this case, a usual stereo image forming process is adopted.

Referring to the Figure, shown in (a) are the left and right images, when the triangular pyramid body 10 and the spherical body 11 as displayed objects are in certain relative depth direction positions to each other.

Shown in (b) are the left and right images, when the sole spherical body 11 has moved toward the left and right visual points 12 and 13.

Shown in (c) are the left and right images, when the sole spherical body 11 has further moved toward the left and right visual points 12 and 13.

As is seen from (a) to (c) in FIG. 4, illustrating the motion of the sole spherical body 11 toward the left and right visual points 12 and 13, the images of the triangular pyramid body 10 in the left and right screens appear to be stationary, while the images of the spherical body 11 appear to be in relative motions toward the mid position between the left and right screens and also becoming greater in size.

Figure 5:
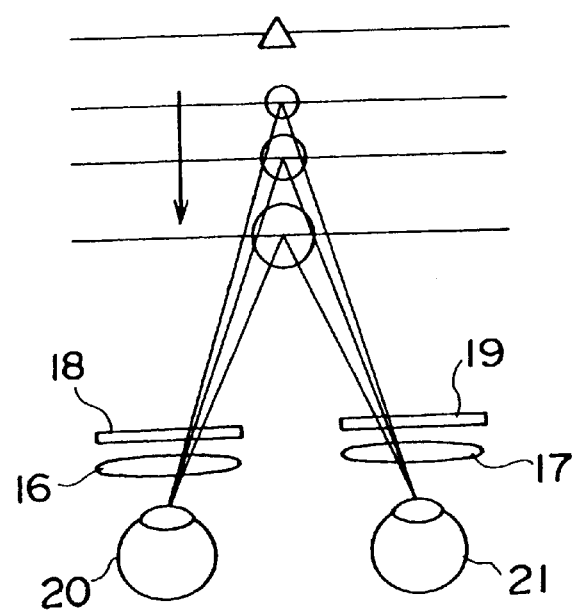
FIG. 5 is a schematic view showing a three-dimensional space image.

FIG. 5 is a schematic view showing a three-dimensional space image, which is formed when the left and right images described before in connection with FIG. 4 are displayed on the left and right display screens 18 and 19 and then enlarged by the left and right eyepiece optical systems (i.e., lenses) 16 and 17.

As is seen from the Figure, a left eyepiece optical system 16 and a left display element 18 are disposed such that they correspond to a left eyeball 20, and a right eyepiece optical system 17 and a right display element 19 are disposed such that they correspond to a right eyeball 21.

In the three-dimensional space image as viewed, the spherical body image, unlike the triangular pyramid body image, appears to be becoming larger and approaching the forefront. As the spherical body image virtually approaches the forefront, the angle of intersection between the visual lines of the left and right eyes viewing the spherical body image, i.e., the vergent angle thereof, is increased.

In other words, the distance of the point of intersection between the visual lines of the left and right eyes from the line connecting the two eyes, i.e., the vergent distance of the intersection point, is reduced. Such vergent distance changes provide for no change in the distance of the virtual image plane from the line connecting the left and right eyes, i.e., the visual distance of the virtual image plane (so long as the position relationship of the left and right display screens and eyepiece optical systems is fixed). This means that the visual and vergent distances are deviated from each other, and such deviation may cause viewer's feel of departure from the normal sense of viewing, and also feel of fatigue in long viewing.

In order to minimize such feel of departure and feel of fatigue, it is conceivable to limit the virtual image progress forward the forefront. Doing so, however, results in reduction of the impact of the three-dimensional image.

An example of literature data concerning the permissible vergent distance, i.e., permissible parallax, is shown below.

Figure 6:
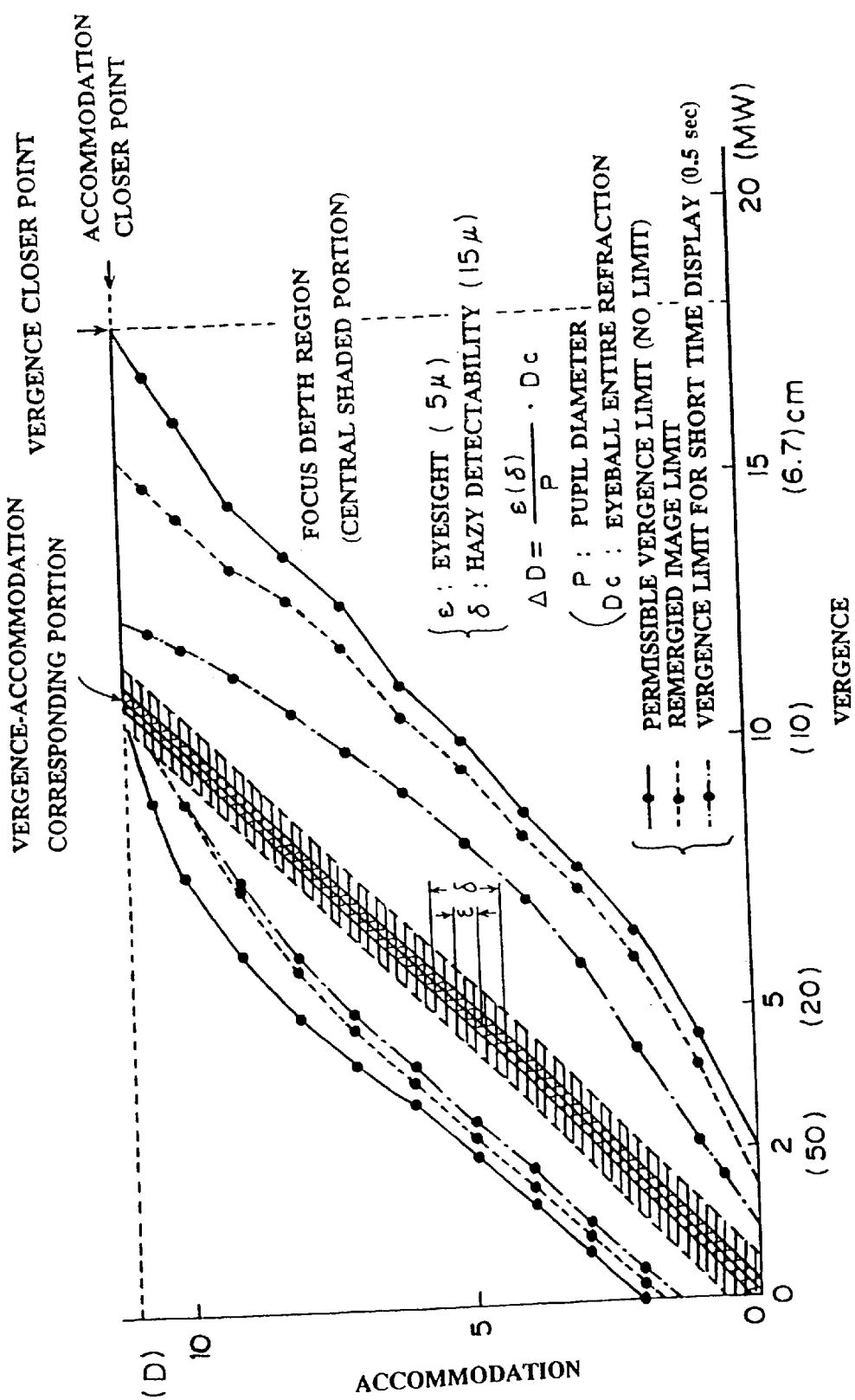
FIG. 6 is a graph showing the correspondence relation between accommodation and vergence.

FIG. 6 is a graph showing the correspondence relation between accommodation (of the focal point of the eyes) and vergence. In the figure, the relation between accommodation vergence and also the permissible parallax are shown ("O plus E", Seiri Kogaku 15, 1985/12, pp. 103). In the graph, the ordinate is taken for the accommodation (diopter) in D (diopter), and the abscissa is taken for the vergence (or vergent angle) in MW. As is seen from the graph, short period display vergence is obtainable so long as the accommodation change is within 4D.

Figure 7:
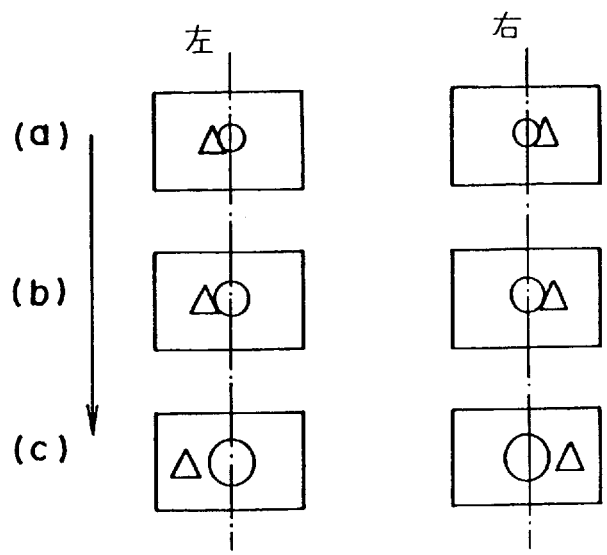
FIG. 7 shows how the display positions of the left and right images, for viewing as a three-dimensional display in the system according to the present invention, are moved with relative depth direction motions of two objects.

FIG. 7 shows how the display positions of the left and right images, for viewing as a three-dimensional display (i.e., stereo display) in the system according to the present invention, are moved with relative depth direction motions of two objects (i.e., a triangle pyramid body and a spherical body) in the display space.

Referring to the Figure, shown in (a) are the left and right images, when the triangular pyramid body as one display object and the spherical body as the other display object (which is under attention), are in certain relative depth direction positions to each other.

Shown in (b) are the left and right images, when the sole spherical body has moved toward the left and right visual points.

Shown in (c) are the left and right images, when the sole spherical body has further moved toward the left and right visual points.

As is seen from (a) to (c) in FIG. 7, illustrating the motion of the sole spherical body toward the left and right visual points, the triangular pyramid body images in the left and right screens appear to be more and more away from the mid point between the two screens, while the spherical body images appear to be becoming greater size without changing their center positions in the left and right screens.

Figure 8:
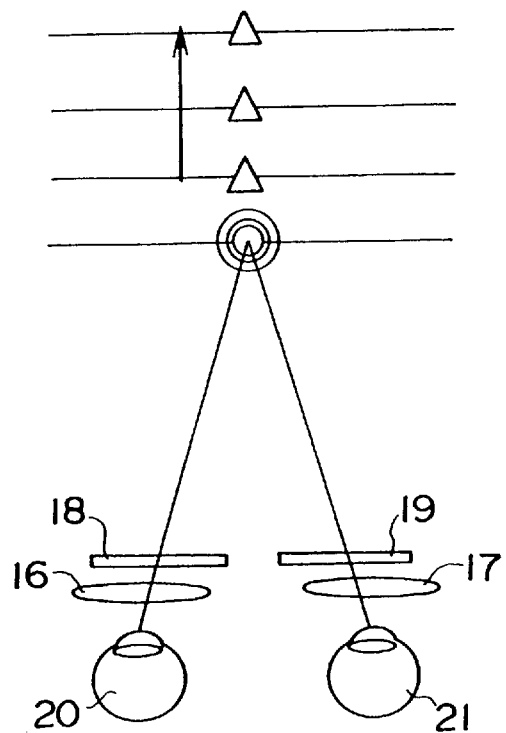
FIG. 8 is a schematic view showing a three-dimensional space image, which is formed when the left and right images, are displayed on the left and right display element screens.

FIG. 8 is a schematic view showing a three-dimensional space image, which is formed when the left and right images described before in connection with FIG. 7 are displayed on the left and right display element screens and then enlarged by the left and right eyepiece optical systems (i.e., lenses). In the Figure, parts like those in FIG. 5 are designated by like reference numerals.

In a usual stereo image display system having two, i.e., left and right, display elements, an image (i.e., object image) free from parallax concerning the two eyes, is viewed at infinite depth direction distance. In this embodiment, when image data representing parallax-free images are supplied to the display, the images displayed on the left and right display elements, form a virtual image at a position, which is spaced apart from the line connecting the left and right eyes by the distance of the point of intersection of the visual lines of the eyes from the connecting line therebetween (i.e., vergent distance),. To this end, the position relationship of the two display elements (i.e., screens) and the corresponding eyepiece optical systems, is set such that the display elements are shifted in position (i.e., given position off-sets) toward each other so that the center-to-center distance between them is less than the center-to-center distance between the eyepiece optical systems (refer to FIGS. 13 to 15 to be described later).

As the display state is changed continuously from the state shown in (a) in FIG. 7 to the state shown in (c), the image of the spherical body appears such that it is gradually increased in size, while the image of the triangular pyramid body appears such it becomes more and more apart from the forefront in the depth direction relative to the spherical body image, as shown by arrow in FIG. 8. Consequently, the spherical body appears as if it approaches the forefront. In this case, however, the vergent angle with respect to the spherical body is unchanged.

In other words, the distance of the point of intersection of the visual lines of the left and right eyes from the line connecting the two eyes, i.e., the vergent distance, is not changed in correspondence to the virtual progress of the spherical body toward the forefront.

This means that the vergent distance of the spherical body, which is the object under attention in this case, i.e., the distance of the virtual image plane of the spherical body from the line connecting the left and right eyes, and the vergent distance, do not deviate from but remain the same with each other. It is thus possible to greatly alleviate the viewer's departure feel and fatigue feel, that are caused when the visual and vergent distances deviate from each other.

Since the departure feel and fatigue feel can be minimized, it is not necessary to limit the virtual image progress toward the forefront, thus preventing the impact of the three-dimensional image from being reduced. Process for detecting a visual direction by a visual direction detecting means to be described later in the HMD and determining a target object as a particular object under attention on the basis of the visual direction data.

Figure 9:
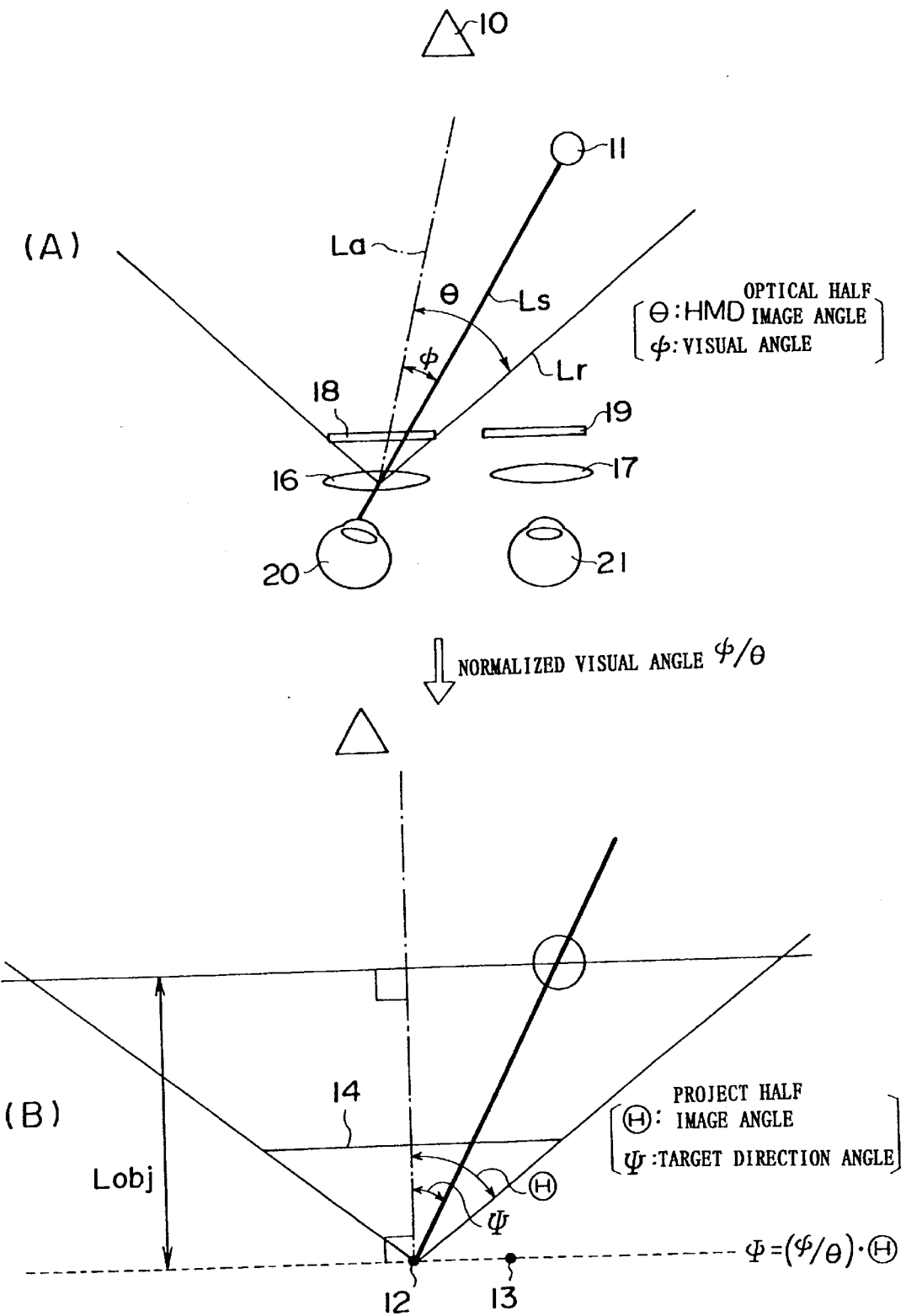
FIG. 9 is a schematic view illustrating how virtual images of objects are viewed with the HMD optical system, for describing a process of obtaining normalized visual direction data from visual direction data provided visual direction detecting means in the HMD.

FIG. 9 is a schematic view illustrating how virtual images of objects are viewed with the HMD optical system, for describing a process of obtaining normalized visual direction data from visual direction data provided visual direction detecting means in the HMD.

In this embodiment, the HMD 2 (see FIG. 2) has eyepiece optical systems (i.e., lenses) for the left and right eyes, respectively, for the viewing of a virtual image of images displayed on the left and right display elements, i.e., LCDs 18 and 19.

As will be described later, in this embodiment only the left eye visual line is detected.

Denoting one half the image angle between the lines from the principal point of the left eye lens 16 to the left and right ends of the left display element (i.e., LCD 18), i.e., the angle between the line Lr drawn from the principal point of the left eye lens 16 to the right end of the LCD 18 and the left optical visual line La drawn from the principal point of the lens to the center of the screen of the LCD 18, by $\theta$, and the angle between the left optical visual line La and the left visual line Ls by $\phi$, the normalized visual angle $\phi/\theta$ is obtained by pertinent computing means in the HMD 2, and data of this angle $\phi/\theta$ is supplied through the interconnecting cable 5 (see FIG. 2) to the image display 4 (see FIG. 2).

For the brevity of description, only the visual angle in x direction (i.e., in the plane of paper) was mentioned. However, in y direction (i.e., in the plane normal to the plane of paper) the normalized visual angle is also computed entirely in the same way, and this data is supplied to the image display 4. The following description also concerns only the visual angle in the x direction (i.e., in the plane of paper) for the brevity of description, and the description concerning the visual angle in the y direction (i.e., in the plane normal to the plane of paper) is entirely the same and is hence omitted.

The above normalized visual angle data is used because of the fact that the half angle $\Theta$ of the visual field from one visual point (i.e., left visual point) 12 may not be equal in absolute value to the angle $\theta$ on the side of the HMD 2. That is, the normalized visual angle data $\phi/\theta$ permits determining the direction of the target object, and hence the target object itself, by multiplying it by the half image angle $\Theta$ in the virtual space, regardless of the absolute value of the angle A schematic view shown in (B) in FIG. 9 is referred to for describing a process of discriminating a target object among a plurality of stereo-modeled objects, i.e., a triangular pyramid body and a spherical body, in the virtual space with the three-dimensional coordinates (not shown) set therein, according to the normalized visual angle data $\phi/\theta$ on the side of the HMD 2 described before in connection with (A) in FIG. 9.

Denoted by $\Theta$ is one half of the image angle (or visual field angle) of a left projection plane 14 from a left visual point 12, among left and right visual points 12 and 13 in the virtual space, i.e., half image angle between a line drawn from the left visual point 12, as an apex, to the center of the left projection plane 14, and a line drawn from the apex to the right end of the left projection plane 14.

The normalized visual angle data $\phi/\theta$ is supplied from the HMD 2 through the interconnecting cable to the stereo image forming device 4, and a target direction angle $\psi$ (i.e., angle between a line drawn from the left visual point as apex to the center of the left projection plane 14 and a line drawn from the apex toward the target) is obtained by multiplying the visual angle $\phi/\theta$ by the half image angle $\psi$.

When the target direction angle $\psi$ is determined, the stereo image forming device 4 can recognize data of the pertinent object among object data held by it, that is, it can determine the target object.

In this example, the target object is the spherical body, and the position (or distance) thereof as viewed in the depth direction from the left visual point 12, is the distance Lobj of the target object.

The description so far concerns the general constitution of the present invention.

A first embodiment of the present invention will now be described.

Figure 10:
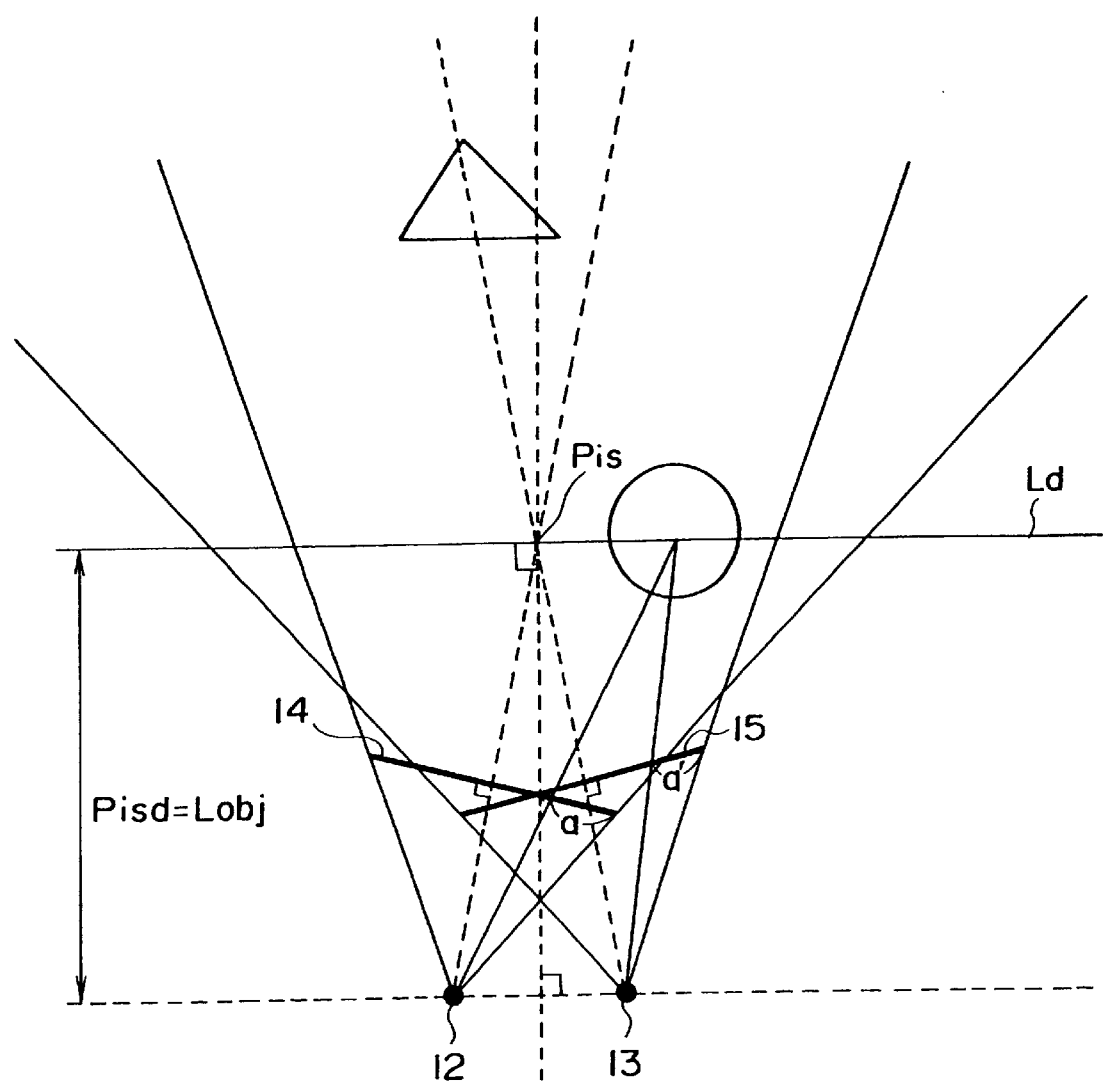
FIG. 10 is a schematic view referred to for the description of the principle underlying the formation, in the embodiment of the apparatus according to the present invention.

FIG. 10 is a schematic view referred to for the description of the principle underlying the formation, in the embodiment of the apparatus according to the present invention, of two, i.e., left and right, pieces of two-dimensional image data, by executing a projection operation with a fixed parallax with respect to a particular object under attention. The illustrated example is of the A mode mentioned before in connection with FIG. 1.

In a virtual space (represented by the entire illustrated area), a triangle pyramid body 10 and a spherical body 11, among a plurality of stereo-modeled objects, are shown. The spherical body 11 is assumed to be a particular object under attention, i.e., a target object. In a projection operation, the objects, i.e., the triangular pyramid body 10 and spherical body 11, are projected from a left and a right visual points 12 and 13 from a first and a second visual point onto left and right projection planes 14 and 15, as first and second projection planes, respectively. As a result of this projection operation, data of a left and a right image, as a first and a second piece of two-dimensional image data, are formed with a fixed parallax with respect to the first and second pieces of two-dimensional piece data, regardless of the depth direction distance of the spherical body as the target object.

To form or generate such left and right image data, the point Pis of intersection between the left and right visual lines, which respectively pass through the let and right visual points 12 and 13 and the centers of the corresponding left and right projection planes 14 and 15 (and are normal to the left and right projection planes 14 and 15, respectively), is held on a line passing through the mid point on the line connecting the left and right viewing points 12 and 13 and normal to this connecting line. Also, the intersection point Pobj is held at a position (on line Ld), which is spaced apart by the distance Lobj of the object under attention, i.e., the spherical body (more stringently the center thereof as assumed) from the line connecting the visual points 12 and 13 of the left and right eyes. To this end, the left and right projection planes 14 and 15 are rotated about the corresponding visual points 12 and 13, while they are held at a fixed distance from the visual points.

In this state, the distance Pisd of the visual line intersection point Pis from the line connecting the visual points 12 and 13 is always equal to the object distance Lobj.

This means that the distance a of the projection point of the spherical body on the left projection plane 14 from the right end thereof, is always equal to the distance a' of the spherical body projection point on the right projection plane 15 from the right end thereof. In other words, the parallax with respect to the first (i.e., left) and second (i.e., right) two-dimensional images is zero in the projection operation concerning the target object (i.e., the spherical body or the point thereof under attention), regardless of the distance of the object in the depth direction.

Figure 11:
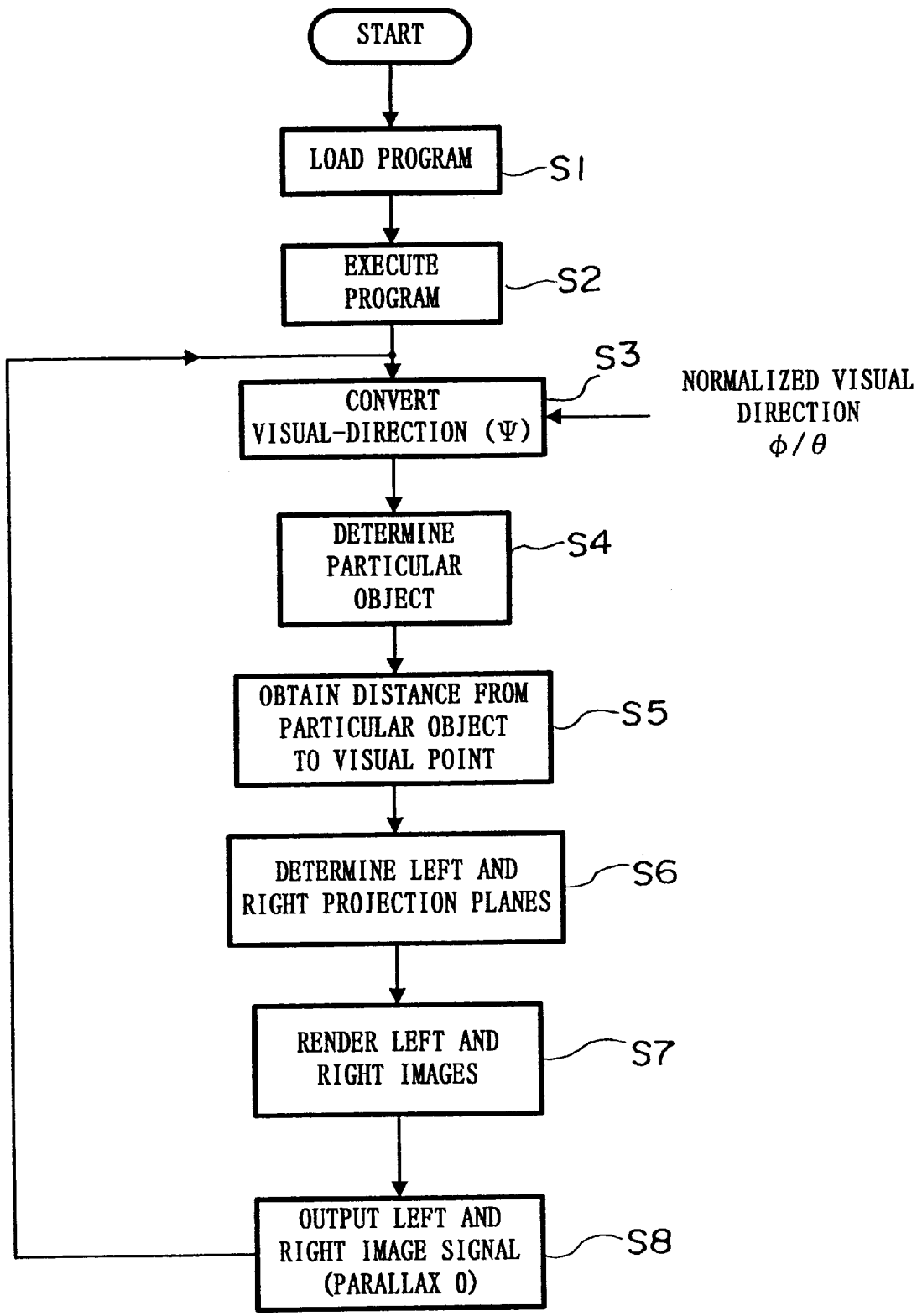
FIG. 11 is a flow chart referred to for the description of a data processing routine.

FIG. 11 is a flow chart referred to for the description of a data processing routine, until the left and right image data are formed by executing the projection operation as described above in connection with FIG. 10.

When the routine is started, a program assuming that a plurality of stereo-modeled objects (including the triangular pyramid body and the spherical body) are provided in the virtual space, is loaded (step S1), and is executed (step S2).

Then, the normalized visual angle data $\phi/\theta$ described before in connection with FIG. 9, is applied from the image display (i.e., HMD) adopted in the stereo image display system in this embodiment to a pertinent image processing function unit, for a process of visual direction conversion according to it to determine the target direction angle $\psi$ (step 3), and the target object (i.e., the spherical body) as a specific object under attention is determined according to the target direction angle (step S4).

When the target object has been determined in this way, its distance Lobj from the line connecting the left and right visual points, is computed by retrieving pertinent data among data loaded in the step S1, about a plurality of objects (step S5).

Then, the left and right projection planes meeting the conditions of the target object as described before in connection with FIG. 10, are determined (step S6).

When the left and right projection planes have been determined in this way, the projection operation (i.e., rendering) is executed to obtain left and right image data (step S7). The data (or signal) thus obtained as a result of the projection operation, is supplied to the image display (i.e., HDM) (step S8).

After the step S8, the routine goes back to the step S3, thus repeating the process in the steps S3 to S8 on the normalized visual angle data $\phi/\theta$ at this time.

Figure 12:
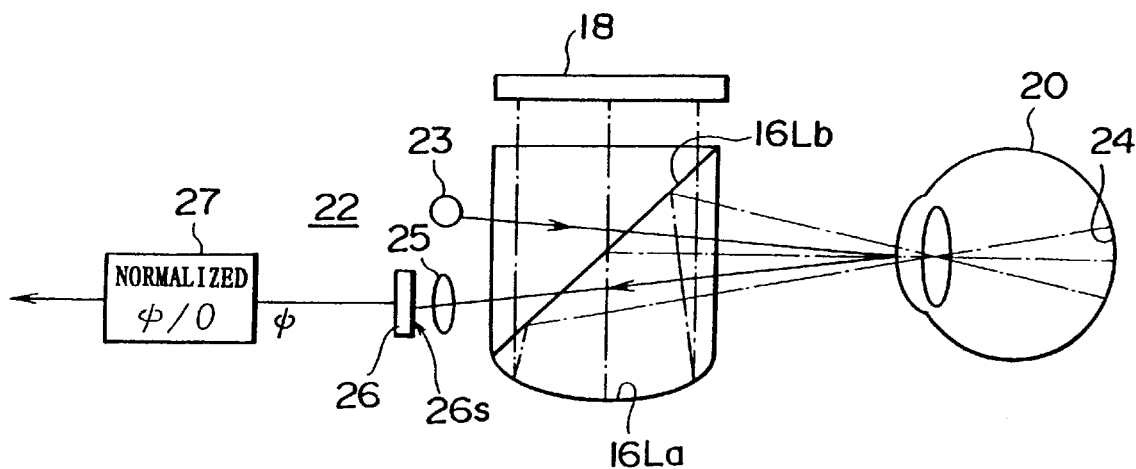
FIG. 12 is a schematic view showing an example of visual direction detecting means 22, which is provided in the image display adopted in the stereo image display system in this embodiment.

FIG. 12 is a schematic view showing an example of visual direction detecting means 22, which is provided in the image display (i.e., HMD) adopted in the stereo image display system in this embodiment, as described before with reference to FIG. 9, and can obtain the above normalized visual angle data $\phi/\theta$.

In this embodiment the visual direction detecting means is provided for the left eye (i.e., left eyeball 20) of the viewer. Referring to FIG. 12, an LCD 18, as a left display element, displays an image of supplied data for the left eye. A left eyepiece optical system 16L is a prism, which includes a convex mirror 16La provided on its own inner bottom surface and a half mirror 16Lb provided substantially diagonally in its inner central part.

A light source 23 of the visual direction detecting means 22 is an infrared LED which emits an infrared beam. The emitted beam from the light source 23 is reflected by the half mirror 16Lb of the prism (i.e., left eyepiece optical system) 16L to be incident as a parallel beam on the left eye 20. The reflected beam from the cornea 24 is transmitted through the half mirror 16Lb and also through a lens 25 to be incident on the photo-electric surface 26S of a photo-electric transducer element 26.

The photo-electric transducer element 26 provides a signal corresponding to the position of beam incidence on the photo-electric surface 26S. This signal represents the visual angle $\phi$, i.e., the angle (half image angle) between the left optical axis La and the left visual line Ls as described before in connection with FIG. 9. A normalized computer 27 processes the visual angle data $\phi$ to determine the normalized visual angle $\phi/\theta$ when the half image angle is zero, as described before in connection with FIG. 9, and supplies this data $\phi/\theta$ through the interconnecting cable to the stereo image forming device 4 (FIG. 2).

Figure 13:
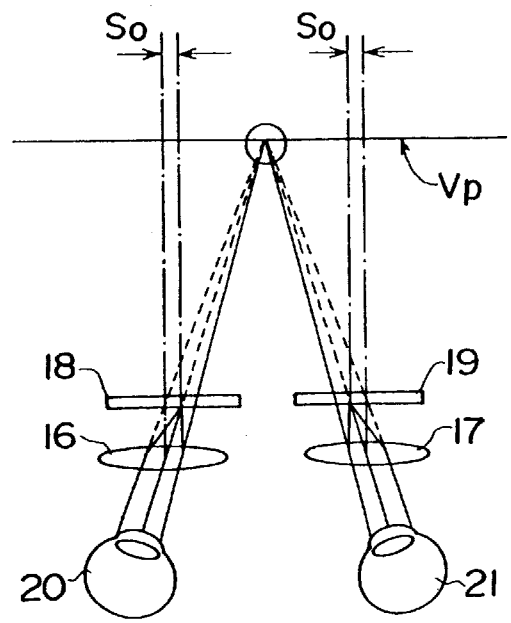
FIG. 13 is a schematic view showing an example of optical system in the HMD adapted in the embodiment of the system according to the present invention.

FIG. 13 is a schematic view showing an example of optical system in the HMD adapted in the embodiment of the system according to the present invention.

In FIG. 13, parts like those in FIG. 8 are designated by like reference numerals and symbols.

In this embodiment, the optical axes of the two eyepiece optical systems (i.e., eyepiece lenses) 16 and 17, passing through the principal points thereof, and the screen centers of the corresponding display elements, are set in the following particular position relationship to one another. The screen centers of the display elements 18 and 19 for the left and right eyes 20 and 21, respectively, are shifted by an equal amount, i.e., a position off-set $S_0$, inwardly of the optical axes the corresponding eyepiece optical systems (i.e., eyepiece lenses) 16 and 17, passing through the principal points thereof, i.e., toward each other. The position off-set $S_0$ is selected such that the position of intersection between the optical visual lines passing through the principal points of the eyepiece optical systems (i.e., eyepiece lenses) 16 and 17 and the screen centers of the corresponding display elements 18 and 19, respectively, is in a virtual image plane provided by the two optical systems.

With the HMD of this construction, when data supplied for displaying left and right two-dimensional images of the target object on the two screens are controlled, by parallax control means of the stereo image forming device, such that the parallax with respect to the two images is zero, the visual distance, i.e., the distance of the virtual image plane Vp of the target object from the line connecting the two eyes, and the vergent distance, do not deviate from but remain the same with each other. Thus, viewer's feel of departure and feel of fatigue due to the difference between the visual distance and the vergent distance, can be greatly alleviated.

Figure 14:
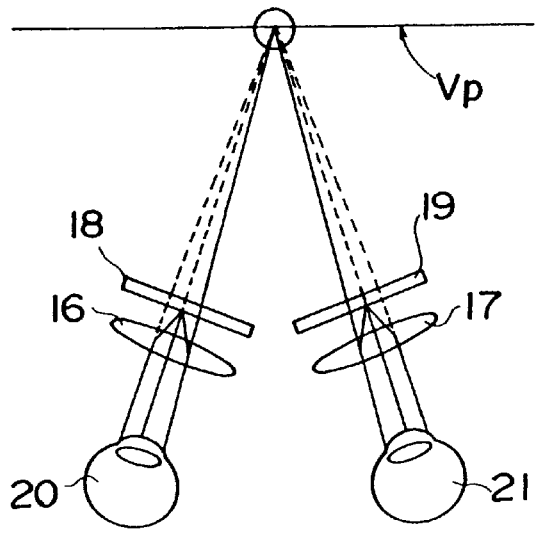
FIG. 14 is a schematic view showing a different example of optical system in the HMD adopted in the embodiment of the system according to the present invention.

FIG. 14 is a schematic view showing a different example of optical system in the HMD adopted in the embodiment of the system according to the present invention. Again in this Figure, parts like those in FIG. 8 are designated by like reference numerals and symbols.

In this example, unlike the preceding example shown in FIG. 13, the screen centers of the two display elements are not shifted by any position off-set $S_0$. Instead, the display elements 18 and 19 and the eyepiece optical systems (i.e., eyepiece lenses) 16 and 17 are tilted by an equal angle toward one another, such that the point of intersection between the optical visual lines, passing through the principal points of the eyepiece optical systems 16 and 17 and the corresponding screen centers, respectively, is in the virtual image plane Vp provided by the two optical systems.

With the HMD of this construction, when data representing left and right two-dimensional images of the target object, to be displayed on the two screens, are controlled, by the parallax control means of the stereo image forming device, such that the parallax with respect to them is zero, the visual distance, i.e., the distance of the virtual plane Vp of the target object from the line connecting the two eyes, and the vergent distance, do not deviate from but remain the same with each other, and the same functions and effects as in the example shown in FIG. 13 are obtainable.

Figure 15:
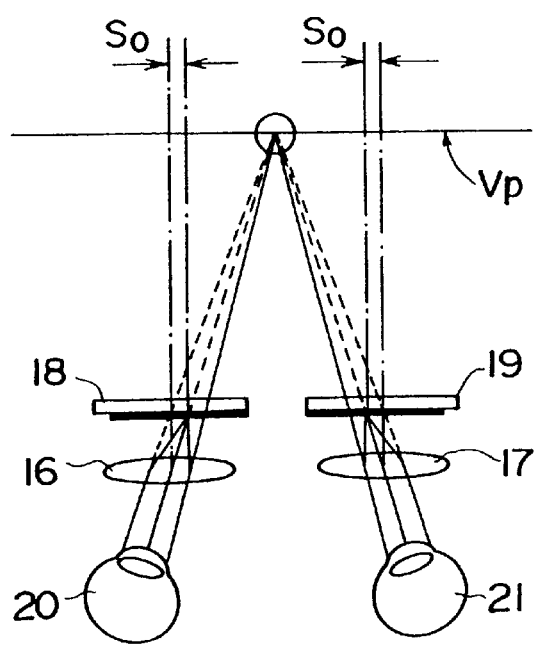
FIG. 15 is a schematic view showing the relation between optical system and image display in an HMD adopted in a different embodiment of the system according to the present invention.

FIG. 15 is a schematic view showing the relation between optical system and image display in an HMD adopted in a different embodiment of the system according to the present invention.

In this case, unlike the previous case shown in FIG. 13, the screen centers of the two display elements are not shifted by any optical system position off-set $S_0$.

That is, the left and right display elements 18 and 19 are disposed such that their screen centers are on the optical axes of the corresponding eyepiece optical systems (i.e., eyepiece lenses) 16 and 17, and data representing the images to be displayed on the display elements 18 and 19 are preliminarily given a predetermined electric shift, such as to produce a position off-set, similar to the off-set $S_0$ described before in connection with FIG. 13, of the center positions of the images represented by such image data.

Again in this case, when data representing left and right two-dimensional images of the target object, to be displayed on the two screens, are controlled such that their parallax is reduced to zero in effect, the visual distance, i.e., the distance of the virtual plane Vp of the target object form the line connecting the two eyes, and the vergent distance, do not deviate from but remain the same with each other, and the same functions and effects as in the example shown in FIG. 13 are obtainable.

Figure 16:
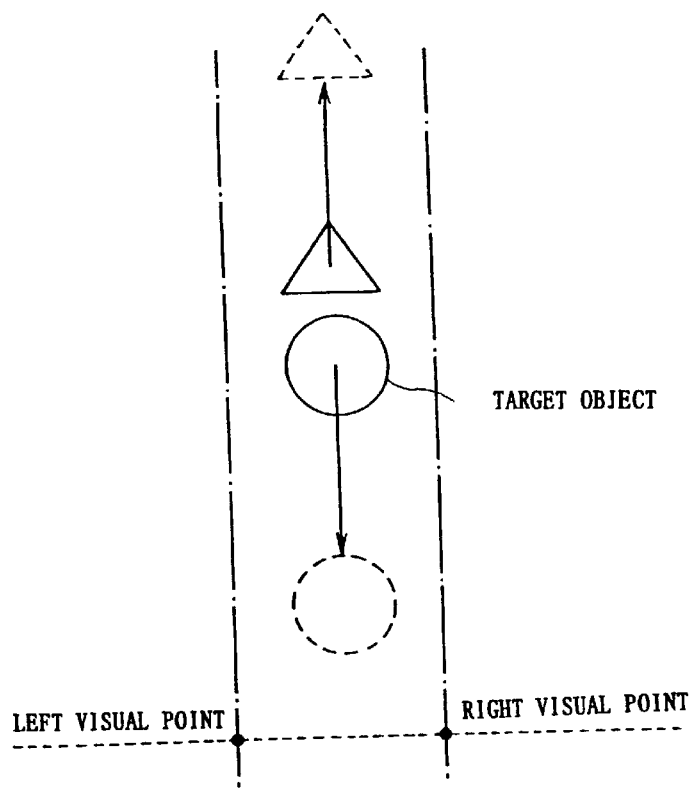
FIG. 16 is a schematic view showing how the two objects are moved relatively, with reference to the left and right visual points, in the virtual three-dimensional space provided by the stereo image forming device in the depth direction of the space.

FIG. 16 is a schematic view showing how the two objects (i.e., the triangular pyramid body and the spherical body as the target object) are moved relatively, with reference to the left and right visual points, in the virtual three-dimensional space provided by the stereo image forming device in the depth direction of the space.

Figure 17:
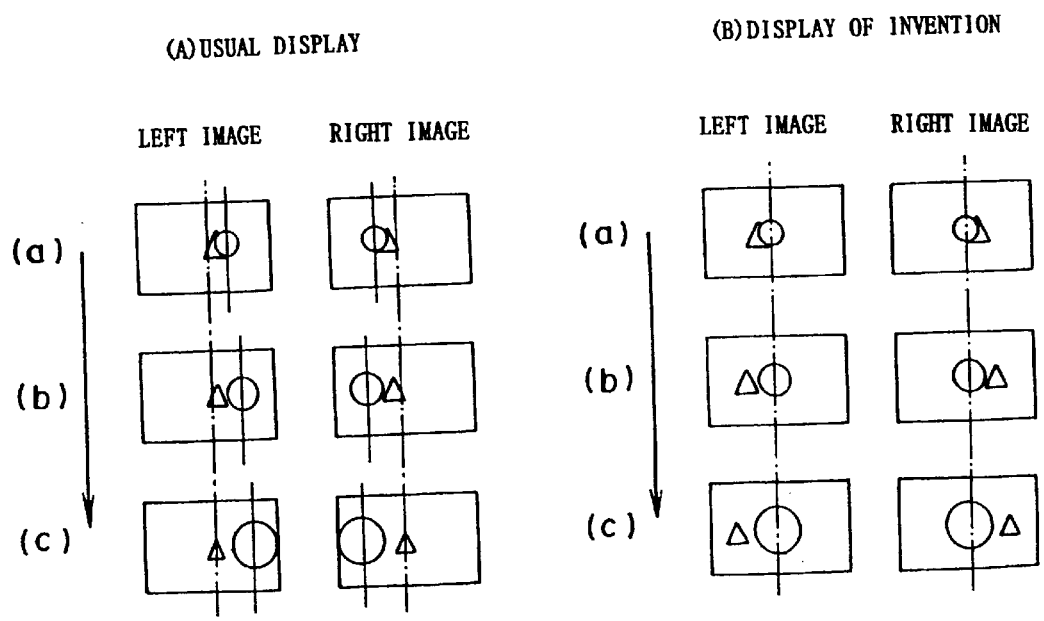
FIG. 17 illustrates how the display positions of the left and right images of the two objects, displayed after the projection operation, are moved in the left and right screens with relative motions of the objects in the depth direction.

FIG. 17 illustrates how the display positions of the left and right images of the two objects, displayed after the projection operation, are moved in the left and right screens with relative motions of the objects in the depth direction.

In the Figure, part (A) illustrates the manner of relative depth direction motions of the two objects (i.e., the triangular pyramid body and spherical body) in the left and right screens, as described before in connection with FIG. 16, in the case of using a usual stereo image forming device. Part (B) illustrates like motion manner in the case of using this embodiment of the stereo image forming device according to the present invention.

Shown in (a) in part (A) are the left and right images, when the triangular pyramid body as an object of display and the spherical body as the target object are at certain relative depth direction positions to each other.

Shown in (b) in part (A) are the left and right images, when the spherical body has moved toward the forefront, while the triangular pyramid body has moved in the opposite direction, i.e., away from the forefront.

Shown in (c) in part (A) at the left and right images, when the spherical body has further moved toward the forefront, while the triangular pyramid body has further moved in opposite direction, away from the forefront.

As is seen from (a) to (c) in part (A), with the motion of the spherical body toward the forefront, i.e., in the opposite direction to the motion of the triangular pyramid body, the left and right images of the triangular pyramid body appear to be in relative motions away from each other toward the centers of the left and right screens, while the left and right images of the spherical body appear to be in relative motions toward the mid point between the left and right screens and also becoming greater in size.

It will be seen that the parallax of the left and right images of even the spherical body as the target object, is changed with the depth direction motion thereof. This means that the visual distance of the target object, i.e., the distance of the virtual image plane, provided by the optical system for viewing the left and right images, from the line connecting the viewer's eyes, and the vergent distance, is increased with depth direction motion of the target object.

In part (B), like part (A), shown in (a) are the left and right images, when the triangular pyramid body and spherical body, as the displayed objects, are at certain relative depth direction positions to each other.

Shown in (b) in part (B) are the left and right images, when the spherical body has moved toward the forefront, while the triangular pyramid body has moved in the opposite direction, i.e., away from the forefront.

Shown in (c) in part (B) are the left and right images, when the spherical body has further moved toward the forefront, while the triangular pyramid body has further moved in the opposite direction, i.e., away from the forefront.

As is seen from (a) to (c) in part (B), with the motion of the spherical body toward the forefront, i.e., in the opposite direction to the motion of the triangular pyramid body, the left and right images of the triangular pyramid body appear to be in relative motions away from each other in the left and right screens, while the left and right images of the spherical body are such that their centers are substantially stationary in the left and right screens but that they are becoming greater in size.

That is, the parallax with respect to the left and right images of the spherical body, which is assumed to be the target object, is not changed with depth direction motion thereof. This means that of the visual distance of the target object, i.e., the distance of the virtual image plane, provided by the optical system for viewing the left and right images, from the line connecting the viewer's eyes, and the vergent distance, accompanying the depth direction motion of the target object, can be kept to a minimum.

It is thus possible to hold the visual and vergent distances to be substantially the same irrespective of the depth direction motion of the target object, by setting the position relationship of the screens and the optical systems as described before in connection with FIG. 13 or 14.

So long as the left and right images of the target object are stationary substantially at the centers of the left and right screens, their parallax is zero. In this case, direct viewing of these two images is always just like viewing the spherical body as the target object at infinite vergent distance. In this embodiment of the present invention, which has the position relationship of the screens and the optical systems as described before in connection with FIG. 13 or 14 or FIG. 15, the target object is viewed such that it is at an adequate finite depth direction distance.

Figure 18:
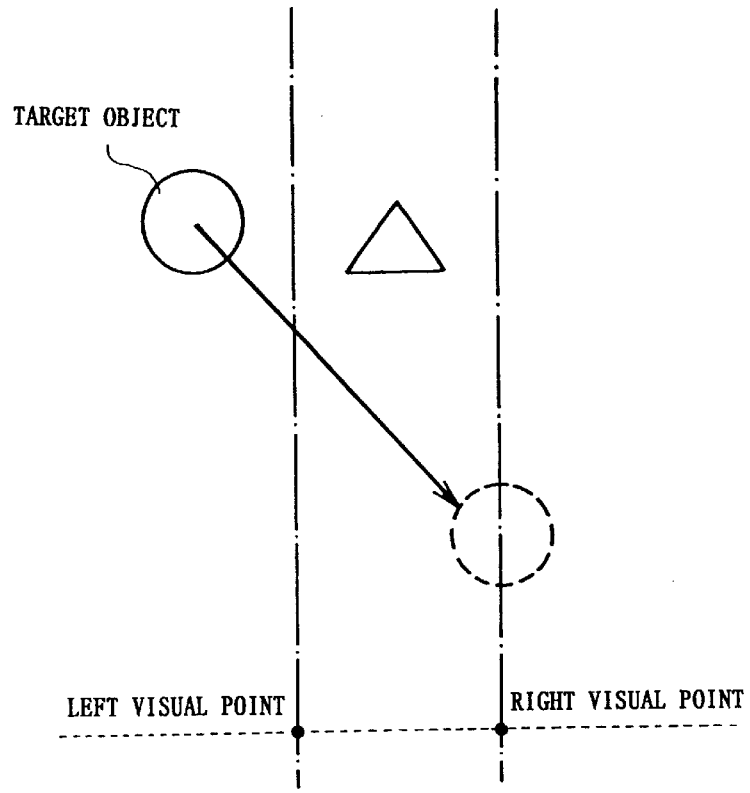
FIG. 18 is a schematic view illustrating how the two object are relatively moved in the virtual three-dimensional space provided by the stereo image forming device, with reference to the left and right visual points.

FIG. 18 is a schematic view illustrating how the two objects (i.e., the triangular pyramid body and the spherical body as the target object), are relatively moved in the virtual three-dimensional space provided by the stereo image forming device, with reference to the left and right visual points.

In this Figure, it is assumed that the spherical body as the target object undergoes motion from a position, which is on the left side of and remoter than a position corresponding to the left visual point, rightward and toward the forefront to a position corresponding to the right visual point.

Figure 19:
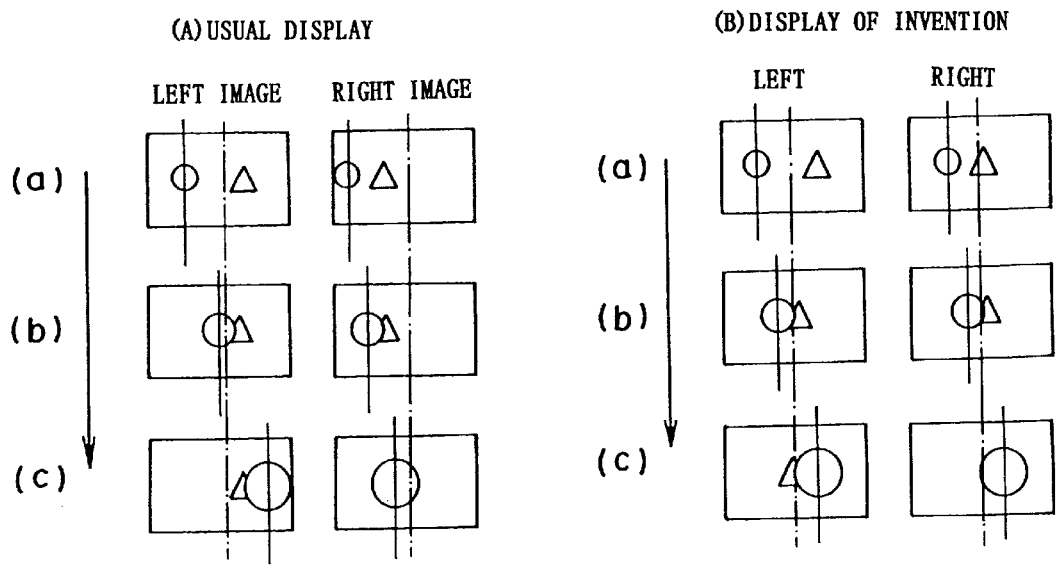
FIG. 19 illustrates how the display positions of the left and right images of the two objects, i.e., displayed after the projection operation as described before, are moved in the left and right screens with the motion of the target object.

FIG. 19 illustrates how the display positions of the left and right images of the two objects, i.e., displayed after the projection operation as described before, are moved in the left and right screens with the motion of the target object as described above.

In the Figure, part (A) illustrates the manner of motion of the display positions of the two objects (i.e., the triangular pyramid body and spherical body) in the left and right screens, with the motion of the target object as described before in connection with FIG. 18, in the case of using a usual stereo image forming device. Part (B) illustrates like motion manner in the case of using this embodiment of the stereo image forming device according to the present invention.

Shown in (a) in part (A) are the left and right images, when the triangular pyramid body as one displayed object and the spherical body as the target object are substantially at a certain equal depth direction position (before motion).

Shown in (b) in part (B) are the left and right images, when the spherical body has moved rightward and toward the forefront, while the triangular pyramid body remains stationary at the previous position.

Shown in (c) in part (A) are the left and right images, when the spherical body has further moved rightward and toward the forefront, while the triangular pyramid body still remains stationary at the previous position.

As is seen from (a) to (c) in part (A), with motion of the spherical body rightward and toward the forefront relative to the triangular pyramid body, the left and right images of the triangular pyramid body appear such that they remain at the initial positions in the left and right screens, while the left and right images of the spherical body both appear such that they are in motions rightward and becoming greater in size. Thus, the position shift amounts of the spherical body in the left and right screen become larger.

That is, the parallax with respect to the left and right images of the spherical body, which is assumed to be the target object as described before in connection with FIG. 17, is changed with depth direction motion of the spherical body. This means that the gap between the virtual distance of the target object, i.e., the distance of the virtual image plane, provided by the optical system for viewing the left and right images, from the line connecting the viewer's eyes, and the vergent distance, is increased.

In part (B), like part (A), shown in (a) are the left and right images, when the triangular pyramid body as one displayed object and the spherical body as the target object are substantially at a certain equal depth direction position (before the motion).

Shown in (b) in part (A) are the left and right images, when the spherical body has moved rightward and toward the forefront, while the triangular pyramid body remains stationary at the previous position.

Shown at (c) in part (A) are the left and right images, when the spherical body has further moved rightward and toward the forefront, while the triangular pyramid body still remains stationary in the previous position.

As is seen from (a) to (c) in part (B), with the motion of the spherical body rightward and toward the forefront relative to the triangular pyramid body, the spherical body image in the left screen appears to be in leftward motion, while that in the right screen appears to be in rightward motion. The left and right images of the spherical body, on the other hand, appear to be in rightward motions while maintaining the shift amounts of their center positions from the left and right screen center positions to be substantially equal, and also becoming greater in size.

That is, the parallax with respect to the left and right images of the spherical body, which is assumed to be the target object, is not changed with depth direction motion thereof. This means that the gap between the visual distance of the target object, i.e., the distance of the virtual image plane, provided by the optical system for viewing the left and right images, from the line connecting the viewer's eyes, and the vergent distance, accompanying the depth direction motion of the target object, can be suppressed to a minimum.

Again, it is thus possible to hold the visual and vergent distances to be substantially the same irrespective of the depth direction motion of the target object, by setting the position relationship of the screens and the optical systems to one another as described before in connection with FIG. 13 or 14.

So long as the left and right images of the target object are stationary substantially at the centers of the left and right screens, their parallax is zero. In this case, direct viewing of these two images always brings abut a state just like a display where spherical body as the target object is at infinite vergent distance. On the other hand, in this embodiment of the present invention, in which the position relationship of the screens and the optical systems is set such as described before in connection with FIG. 13, 14 or FIG. 15, the target object can be viewed such that it is at an adequate finite depth direction distance.

FIG. 20 is a schematic view showing a three-dimensional space image, which is formed when the left and right images are displayed on the screens of the left and right display elements 18 and 19 and enlarged by the left and right eyepiece optical systems (or lenses) 16 and 17 as described before in connection with part (A) in FIG. 19, in the case of using a usual image display.

With the motion from the state in (a) to (c) in part (A) of FIG. 19, the image of the spherical body appears to be becoming greater in size while proceeding obliquely rightward and toward the forefront as shown by arrow, while the triangular pyramid body is not changed in size and position.

FIG. 21 is a schematic view showing a three-dimensional space image, which is formed when the left and right images are displayed on the screens of the left and right display elements 18 and 19 and enlarged by the left and right eyepiece optical systems (or lenses) 16 and 17 as described before in connection with part (B) in FIG. 19, in the case of using the image display according to the present invention.

With motion from the state (a) to the state (c) in part (B) of FIG. 19, the image of the spherical body appears to be becoming greater in size while being in rightward motion, while the image of the triangular pyramid body appears to be proceeding away from the forefront without change in size. Consequently, the viewer who is viewing the two images at a time, feels that the image of the spherical body is becoming greater in size and proceeding obliquely rightward and toward the forefront.

In the case of FIG. 21, the image display used is such that, as described before in connection with FIG. 13, the screen center positions of the two display elements for the left and right eyes, are shifted by an equal amount (i.e., positional off-set $S_0$) inwardly (i.e., toward each other) from the optical axes of the corresponding eyepiece optical systems (i.e., eyepiece lenses) passing through the principal points thereof. The position off-set is selected such that the point of intersection between the optical visual lines passing through the principal points of the eyepiece optical systems (or eyepiece lenses) and the corresponding screen centers, are in a virtual image plane provided by the two optical systems.

According to the present invention, the vergent distance, i.e., the distance of the point of intersection between the visual lines of the left and right eyes from the line connecting the two eyes, is not changed with any virtual approach, i.e., virtual progress of an object such as the spherical body toward the forefront. The spherical body as the object under attention thus appears such that its visual distance, i.e., the distance of its virtual image plane from the line connecting the left and right eyes, and its vergent distance, do not deviate from but remain the same with each other. Thus, it is possible to greatly alleviate viewer's feels of departure and fatigue that are caused when the visual and vergent distances deviate from each other.

Since such feel of departure and feel of fatigue can be minimized, it is not necessary to limit the virtual approach or virtual progress of an object image toward the forefront with motion of the object. Thus, it is possible to prevent the impact of the three-dimensional image from being reduced.

A second embodiment of the present invention will now be described.

Figure 22:
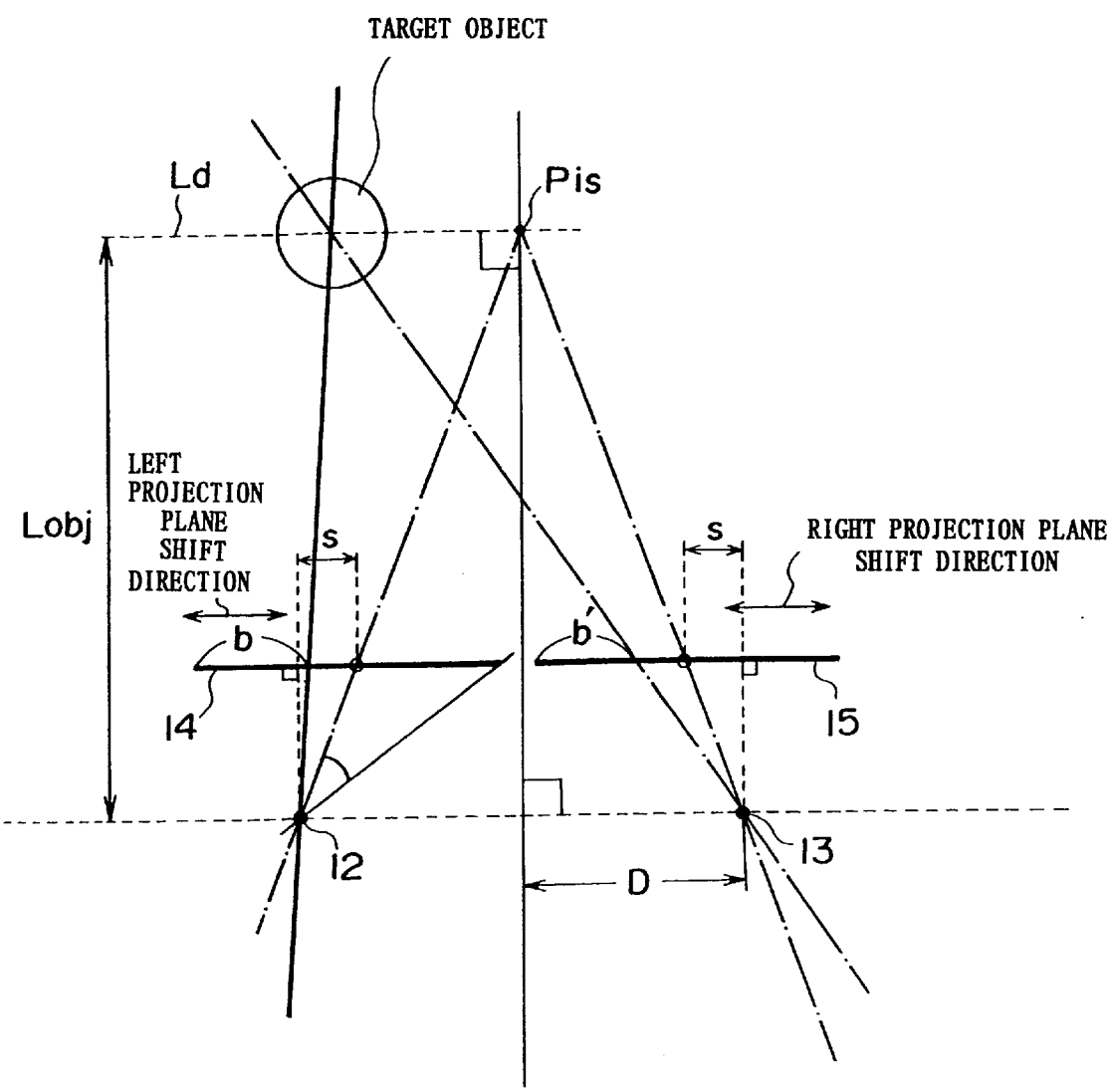
FIG. 22 schematically illustrates the principles underlying the second embodiment, in which the image formation is such that the parallax between the left and right images concerning the target object is zero.

FIG. 22 schematically illustrates the principles underlying the second embodiment, in which the image formation (or image data generation) is such that the parallax between the left and right images concerning the target object is zero. Like the preceding first embodiment, this embodiment is a system of the A mode (rendering control plus rendering) as described before in connection with FIG. 1. However, this embodiment is different from the first embodiment in the method of the rendering control.

More specifically, in this embodiment the left and right projection planes 14 and 15 are shifted in a direction in them such that the image of the spherical body as the target object is projected onto the left projection plane 14, such that its center is at distance b from the left end of the left projection plane 14, and also is projected onto the right projection plane 15, such that its center is at a distance b' from the left end of the right projection plane 15.

The distances b and b' are equal, by which the left and right projection planes 14 and 15 are shifted in a direction therein.

To generate such left and right image data, an operation is executed, which corresponds to shifting the left and right projection planes 14 and 15, corresponding to the left and right visual points 12 and 13 as shown, in a direction in these projection planes while holding the left and right visual points 12 and 13 at a constant distance from each other, so that a visual line intersection point Pis, i.e., the point of intersection between the left and right visual lines, passing the left and right visual points 12 and 13 and the centers of the corresponding left and right projection planes 14 and 15, respectively, is at a position (shown by dashed line Ld), which is on the mid point normal to the line segment connecting the left and right visual points 12 and 13 and spaced apart by the object distance Lobj, i.e., the distance of the object, i.e., the spherical body (more stringently the point thereof under attention, which is assumed to be the center of the spherical body as shown), from the Line connecting the left and right visual points 12 and 13.

Under these conditions, the visual line intersection point distance Pisd, i.e., the distance of the visual line intersection point Pis from the line connecting the left and right visual points 12 and 13, is always equal to the object distance Lobj.

Also, under the above conditions the parallax concerning the first (i.e., left) and second (i.e., right) two-dimensional images, based on the projection operation concerning the target object (i.e., the spherical body or point thereof under attention), is constant irrespective of the depth direction distance of the object. That is, the distances b and b' are always equal as shown.

Denoting the distance between the intersection point, which is between the left projection plane 14 and the normal thereto that passes through the left visual point 12, and the Intersection point, which is between the left projection plane 14 and the line connecting the left visual point 12 and the visual line intersection point Pis, and the intersection point, by S, denoting the distance between the mid point of the line segment connecting the left and right visual Points 12 and 13 and either one thereof, i.e., half distance between the two visual points, by D, and denoting one half of the angle of the visual direction from either visual point (for instance left visual point 12) with respect to the corresponding projection plane (i.e., left projection plane 14), i.e., half image angle, by $\psi$, the distance S can be handled as the following no-dimensional quantity corresponding to the size of the projection plane.

$$S = \frac{D}{Lobj} \cdot \frac{l}{\tan\Theta} \qquad (1)$$

Since one half of the horizontal direction pixel number Ph of the pertinent screen, i.e., Ph–half, corresponds to 1 in the numerator on the right side of the Equation 1, in terms of Ph–half the distance S is expressed as follows:

$$S = \frac{D}{Lobj} \cdot \frac{P - half}{\tan\Theta} \qquad (2)$$

It is thus possible to obtain the same left and right images and same effects as in the first embodiment.

Figure 23:
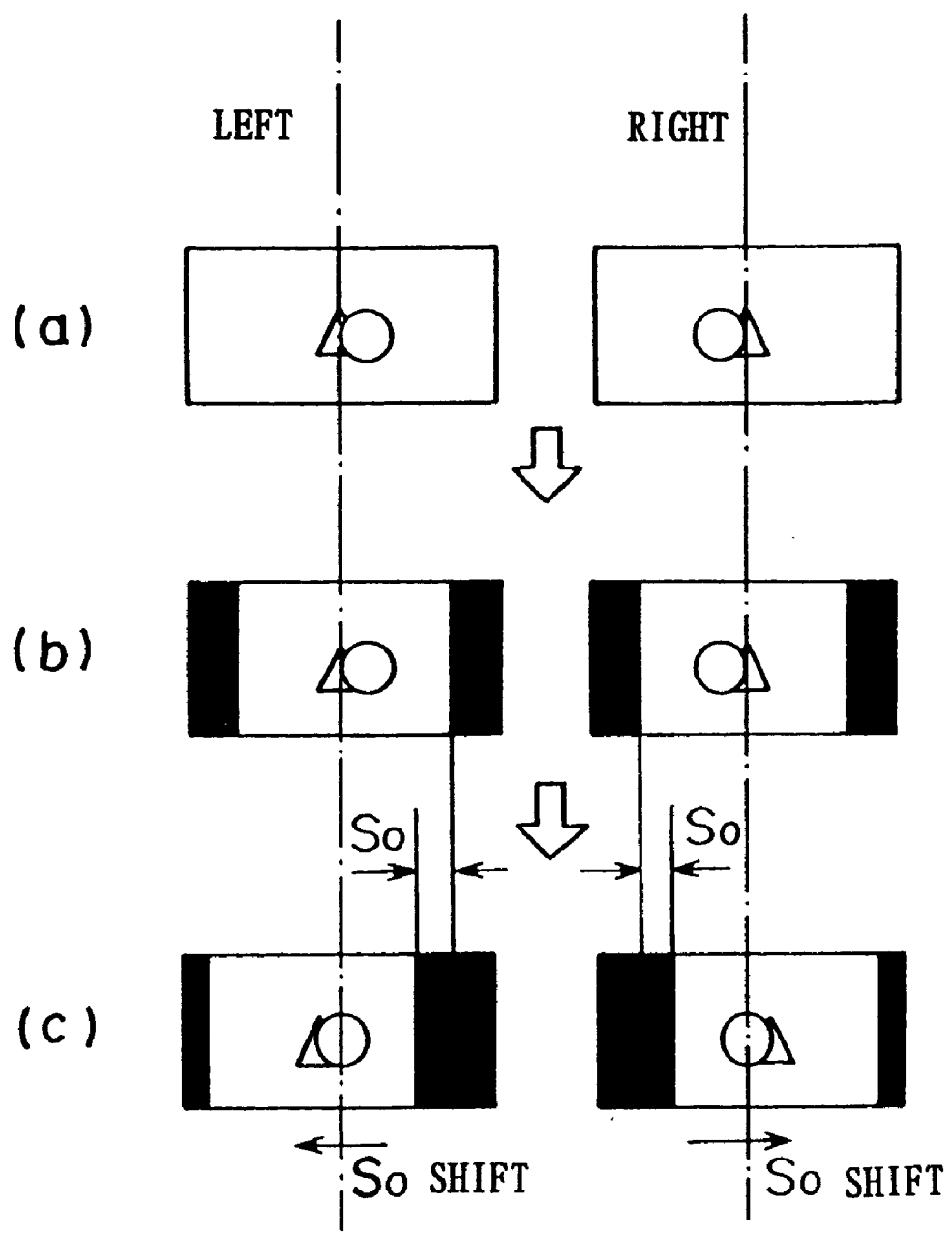

A third embodiment of the present invention will now be described. This embodiment is a system of the B mode as described before in connection with FIG. 1. The left and right images that are obtainable are the same as in the first embodiment. FIG. 23 illustrates a manner of optimizing the parallax of the left and right images, for obtaining a stereo image, concerning the target object among two displayed objects (i.e., a triangular pyramid body and a spherical body) in the system according to the present invention, by controlling the state of display on the two screens.

Part (a) in the Figure shows the left and right images, involving the triangular pyramid body as one displayed object and the spherical body as the other displayed object (which is under attention), the images being displayed by directly using image data obtained by rendering.

Part (b) in the Figure shows the left and right images displayed together with a black frame on the left and right screens. The black frame is displayed in order to prevent a change of the area of each displayed image when the images are shifted as in part (c) as described below.

Part (c) in the Figure shows the left and right images in the case where the images, inclusive of the black frame, are shifted by So as shown such that the parallax between the two images concerning the spherical body as the target object is zero.

Figure 24:
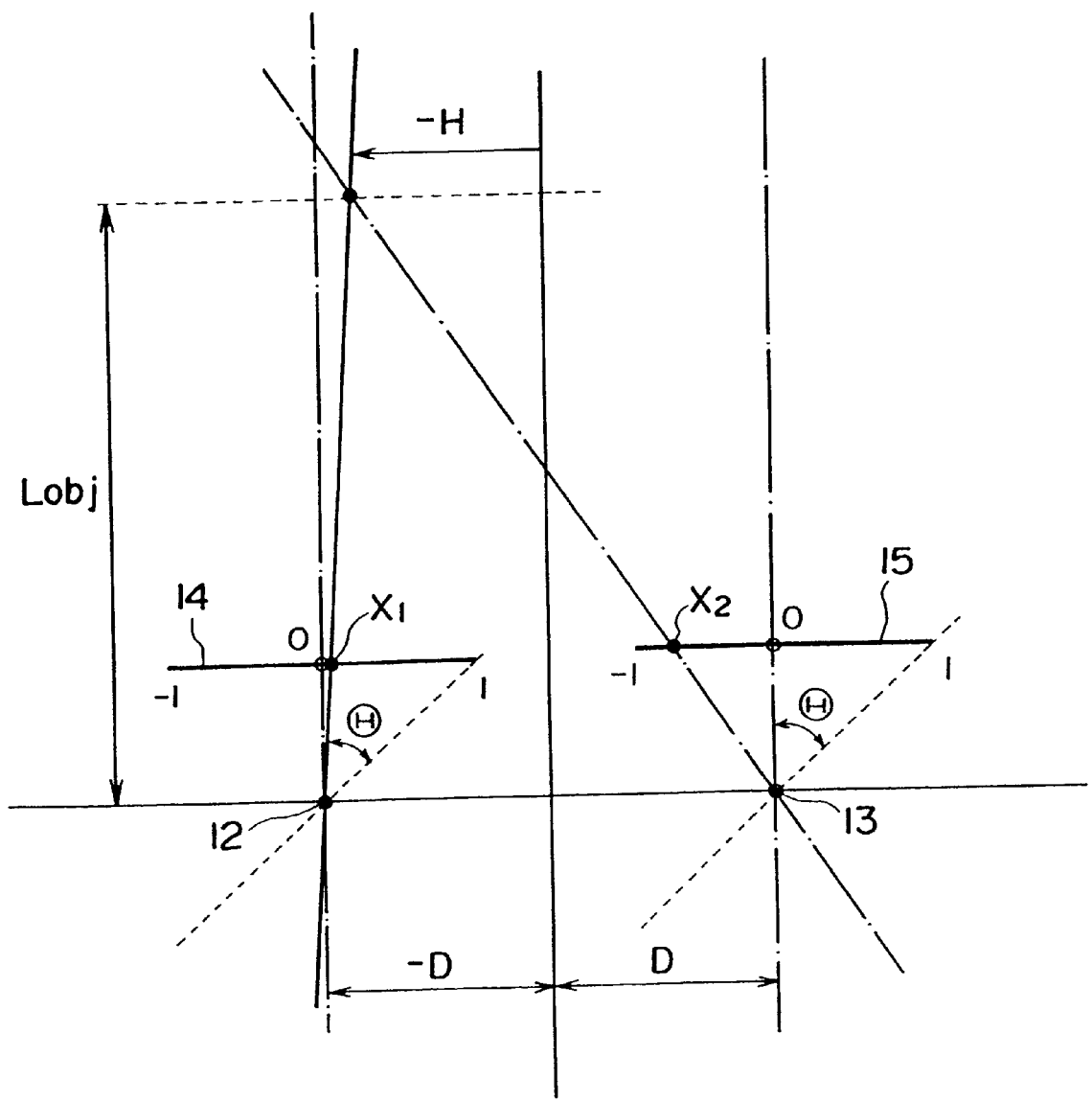
FIG. 24 is a schematic view illustrating the principles underlying the derivation of a condition formula in the case, in which the images in the embodiment of the apparatus according to the present invention are shifted such that the parallax concerning the particular object under attention is zero.

FIG. 24 is a schematic view illustrating the principles underlying the derivation of a condition formula in the case, in which the images in the embodiment of the apparatus according to the present invention are shifted such that the parallax concerning the particular object under attention is zero.

In the Figure, denoted by D is the distance of the mid point 0 on the line segment connecting the left and right visual points 12 and 13 from either thereof (i.e., one half of the distance between the left and right visual points 12 and 13), denoted by is one half of the angle of the visual direction from each visual point (i.e., the left or right visual point 12 or 13) viewing the corresponding projection plane (i.e., projection plane 14 or 15), (i.e., half image angle), denoted by X1 is the distance of the center of the target object image projected onto the left projection plane 14 from the center thereof, X2 is the distance of the center of the target object image projected onto the left projection plane 15 from the center thereof, and Lobj is the distance of the target object (more stringently the point thereof under attention, for instance the center of the spherical body as assumed) from the line connecting the left and right visual points 12 and 13 (i.e., the object distance). Denoted by –H is the position (or distance) of the target object (i.e., the center thereof) with reference to the mid point normal to the line segment connecting the two visual points.

Figure 25:
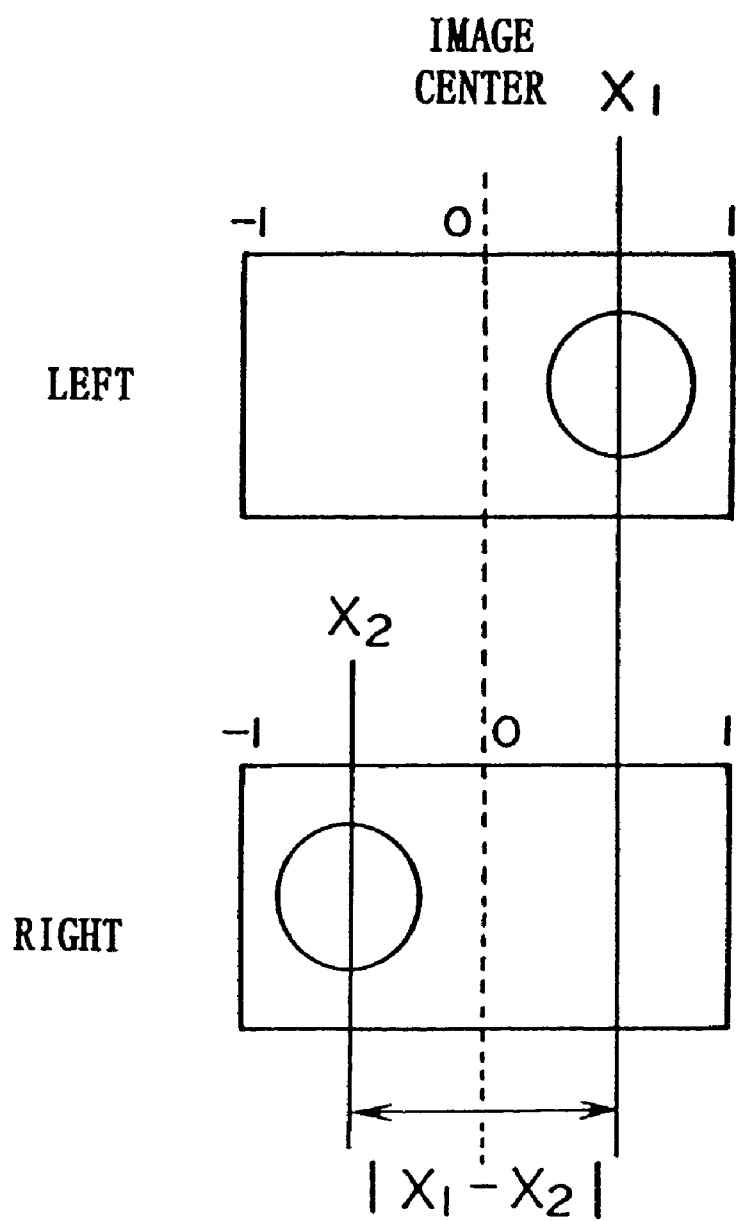
FIG. 25 is a schematic view illustrating the principle of the parallax of the left and right images viewed on the screens of the left and right LCDs corresponding to the left and right projection planes.

FIG. 25 is a schematic view illustrating the principle of the parallax |X1−X2| of the left and right images viewed on the screens of the left and right LCDs corresponding to the left and right projection planes. This illustration is a standardized one obtained by setting the horizontal dimension of the screen of each LCD to "2". The following Equation 3 expresses the parallax |X1−X2| of the left and right images, based on various values described before in connection with FIGS. 24 and 25.

$$|X_1 - X_2| = \frac{2D}{Lobj} \cdot \frac{1}{\tan\Theta} \qquad (3)$$

The Equation 2 means that the parallax |X1−X2| can be obtained once Lobj is obtained irrespective of the position of the target object, more stringently the center thereof (i.e., the position −H of the target object center with reference to the normal to the line segment connecting the left and right visual points 12 and 13, the normal passing through the mid point 0 on the line segment, as shown in FIG. 25), that is, it is possible to determine various values corresponding to an optimum value of the parallax.

Then, the necessary shift amount S0 of the images inclusive of the black frame, as shown in FIGS. 25 or 23, such that the parallax |X1−X2| as derived above is always zero, is determined. As described before in connection with FIG. 22, in terms of the pixel number of a screen, 1 in the numerator of the right side of the Equation 1 can be substituted for by one half Ph-half of the horizontal direction pixel number Ph of the screen. Thus, denoting one half of the inter-eye distance (i.e., half inter-eye distance) by d and the visual distance of the virtual image plane provided by the optical systems from the two eyes by Lbase, the shift amount So is expressed as follows.

$$S_0 = \frac{-d}{L_{Base}} \cdot \frac{P_H - holf}{\tan\Theta} \qquad (4)$$

Figure 26:
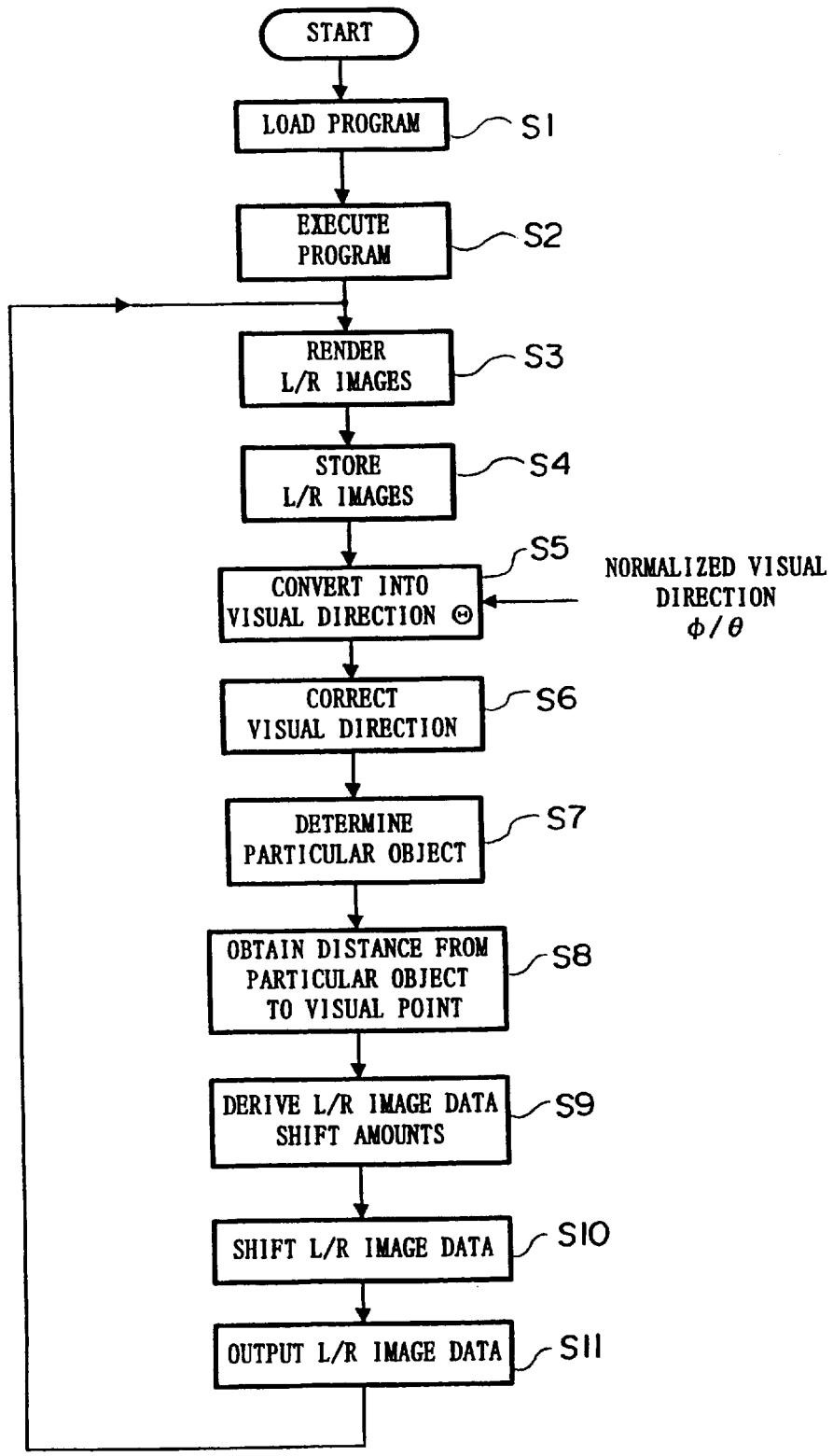
FIG. 26 is a flow chart illustrating a data processing routine until obtaining the left and right image data by executing the projection operation.

FIG. 26 is a flow chart illustrating a data processing routine until obtaining the left and right image data by executing the projection operation as described before inn connection with FIG. 24.

When the routine is started, a program assuming a virtual space in which a plurality of stereo-modeled objects (i.e., a triangular pyramid and a spherical body), is loaded (step S1), and then executed (step S2).

In this embodiment, rendering of the left and right images with respect to the plurality of objects (i.e., the triangular pyramid body and spherical body), is executed right after the program execution (step S3). Then, image data obtained as a result of the rendering are stored (step S4). Then, visual angle data $\phi/\theta$, having been normalized as described before in connection with FIG. 9, is supplied from the HMD employed in the stereo image display system in this embodiment. On the basis of this data, the visual direction conversion is executed to determine the angle Θ of the target object (step S5). This angle Θ is subjected to visual direction correction corresponding to the previous shift (step S6).

This is executed because the object, which was viewed previously by the viewer, has been shifted, so that it is necessary to remove the influence of the shift and obtain the visual direction without influence of shift. On the basis of the corrected visual direction, the target object (i.e., the spherical body in this case) as the particular object under attention is determined (step S7).

When the target object has been determined in the above way, the distance Lobj thereof from the visual points (i.e., the line connecting the left and right visual points), is determined by retrieving for pertinent data among the data concerning the plurality of objects, having been loaded in step S1 (step S8).

Then, the shift amount of the left and right image and black frame data, meeting the conditions as described before in connection with FIG. 25 to fit the state of the target object, are derived (step S9). According to the data thus obtained (representing the shift amount), the data supplied to the HMD is controlled to shift the left and right image and black frame data (step S10). The shifted data are then outputted (step S11).

The routine then goes back to the step S3 to repeat the steps S3 to S11 with respect to the normalized visual angle data $\phi/\theta$ at this time.

A fourth embodiment of the present invention will now be described.

This embodiment corresponds to the B mode as described before in connection with FIG. 1. However, this embodiment is different from the preceding third embodiment in the method of image conversion.

Figure 27:
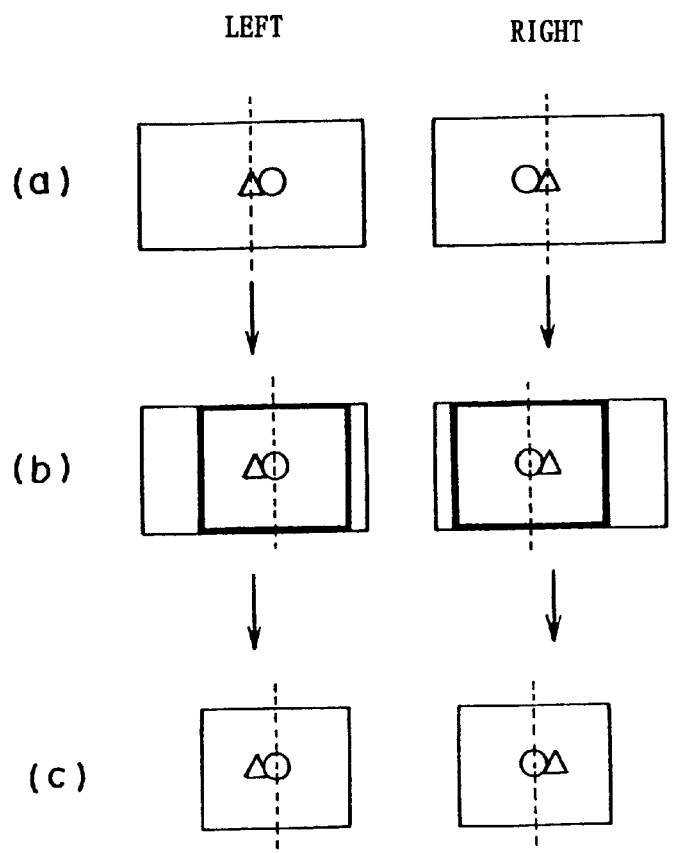
FIG. 27 shows the manner of optimizing the parallax of the left and right images, for obtaining a stereo image in the apparatus according to the present invention, concerning the target object among two objects that the displayed, by controlling the state of display on the two screens.

FIG. 27 shows the manner of optimizing the parallax of the left and right images, for obtaining a stereo image in the apparatus according to the present invention, concerning the target object among two objects (i.e., a triangular pyramid body and a spherical body) that the displayed, by controlling the state of display on the two screens.

The form of the present invention shown in FIG. 27 is a sort of modification of the form described before in connection with FIG. 23. In this case, the positions at which the target object is displayed on the screens are not actually shifted. Instead, the positions, at which images involving the target object are cut out or extracted from the original large horizontal dimension screen area, are varied without varying the target object positions in the original screens, thereby obtaining the same effect as in the case of actually shifting the display positions of the target object.

Part (a) in the Figure shows the left and right images on the original large horizontal dimension screen, involving the triangular pyramid body as one displayed object and the spherical body as the other object (which is under attention in this case), which are obtained by directly using the image data obtained as a result of rendering.

Part (b) in the Figure shows how images involving the target object are cut out from the original horizontal dimension areas of the left and right screens.

Parts (c) in the Figure shows the left and right images, which are cut out (or extracted) from the original horizontal dimension screen areas such that they involves the spherical body as the target object.

Figure 28:
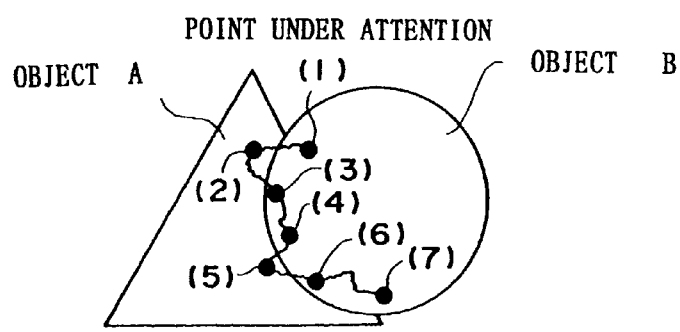
FIG. 28 is a schematic view referred to for describing the operation of a distance determining system according to the present invention, to discriminate the target object and determine the distance thereof.

A fifth embodiment of the present invention will now be described. FIG. 28 is a schematic view referred to for describing the operation of a distance determining system according to the present invention, to discriminate the target object and determine the distance thereof (i.e., Lobj as mentioned before).

In FIG. 28, object A (i.e., a spherical body) and object B (i.e., a triangular pyramid body) are shown such that they are partly overlapped in their image projection on a certain plane. Human's visual points usually tend to move progressively while undergoing slight motion in a relatively short period of time. This phenomenon is well known as involuntary eye movement. Due to this involuntary eye movement, it is difficult to accurately specify an object under attention by merely sampling the visual direction at a certain time instant.

Accordingly, by sampling a plurality of visual directions (or points under attention) in a predetermined period of time and using the sampled data collectively as a basis of judgment, it is possible to relatively accurately specify the object under attention and accurately determine the distance thereof.

In the illustrated example, 7 points under attention are detected in 500 ms.

Figure 29:
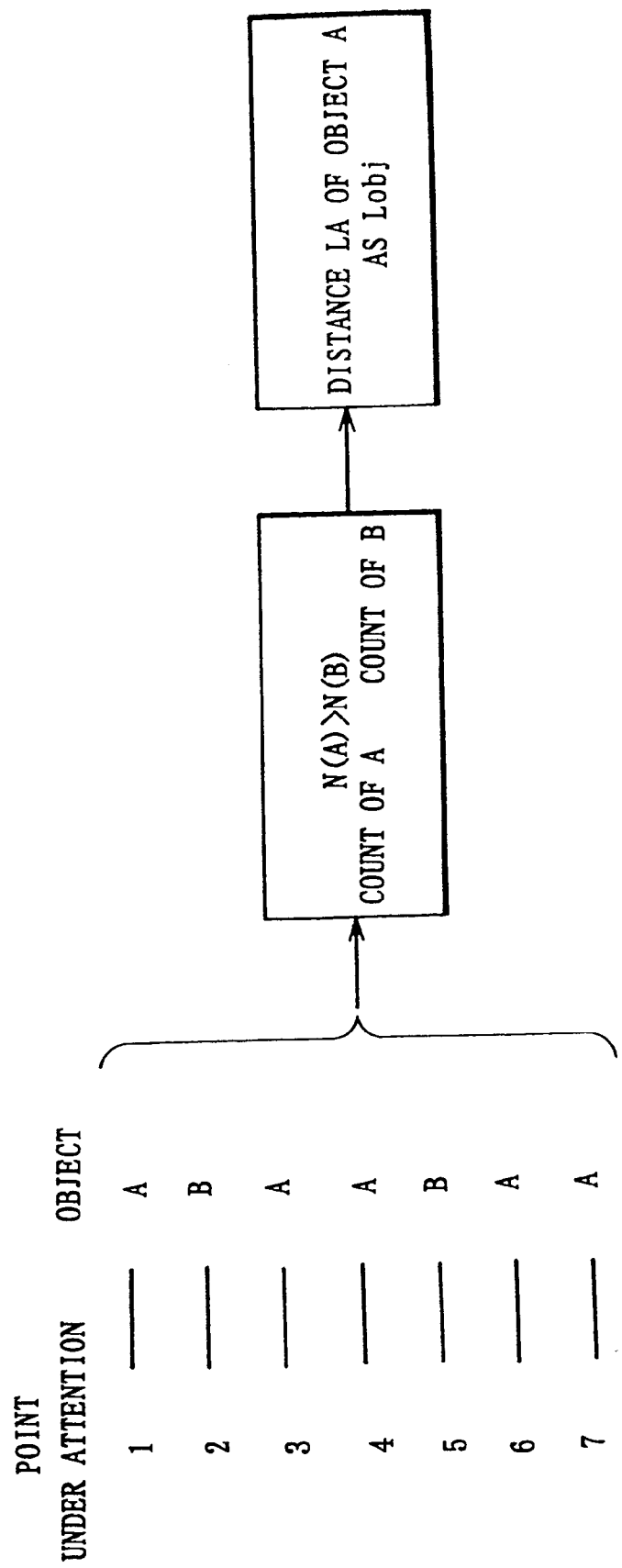
FIG. 29 is a schematic view referred for describing how to determine the object under attention and the distance of the object according to data of the seven points under attention described before in connection with FIG. 28.

FIG. 29 is a schematic view referred for describing how to determine the object under attention and the distance of the object according to data of the seven points under attention described before in connection with FIG. 28.

More specifically, in this method, the count (or number) N (A) for each of seven points 1 to 7 under attention that belong to the object A, and the count N (B) of those belonging to the object B, are determined.

The two counts N (A) and N (B) are then compared, and the object of the greater count or number of times (for instance the spherical body as the object A) is determined as the object under attention. Then, the distance LA of this object under attention is determined according to pertinent image data that is held, and this distance is outputted as Lobj noted above.

Figure 30:
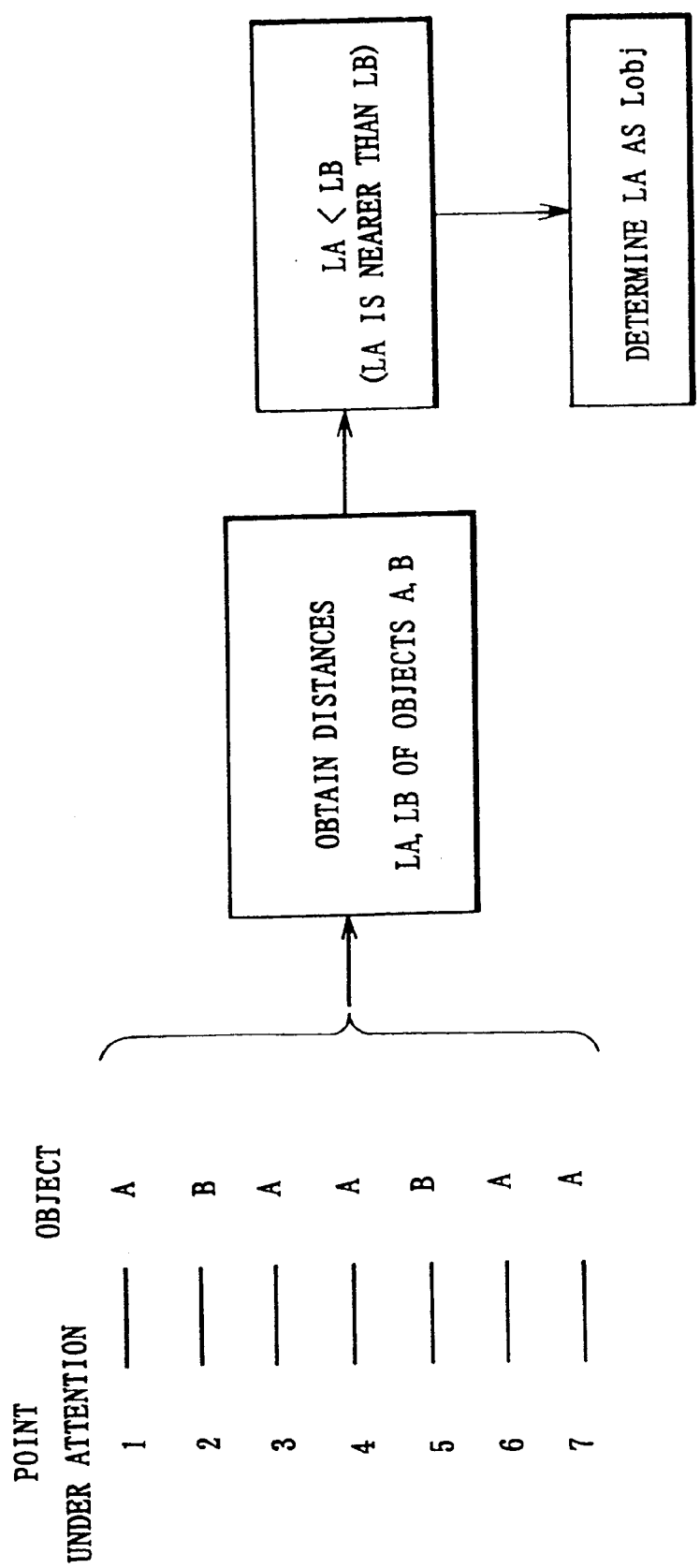
FIG. 30 is a schematic view referred to for describing a method for determining the object corresponding to each of the seven points under attention, distances of such objects and the least distance.

FIG. 30 is a schematic view referred to for describing a method, in which the object corresponding to each of the seven points under attention, as described before in connection with FIG. 28, is first determined, then the distances of such objects are determined, and the least distance is determined as the distance of the object under attention.

More specifically, in this method, the object to which each of the seven points 1 to 7 under attention belongs, is first discriminated. In this example, either the object A or the object B is discriminated. Then, the distance of the discriminated object is determined according to pertinent image data that is held.

The determined distances (LA and LB) are then compared, and the least one of them is determined and outputted as the distance of the object under attention. This method is based on the assumption that the viewer usually views the object at the least distance as the object under attention.

Figure 31:
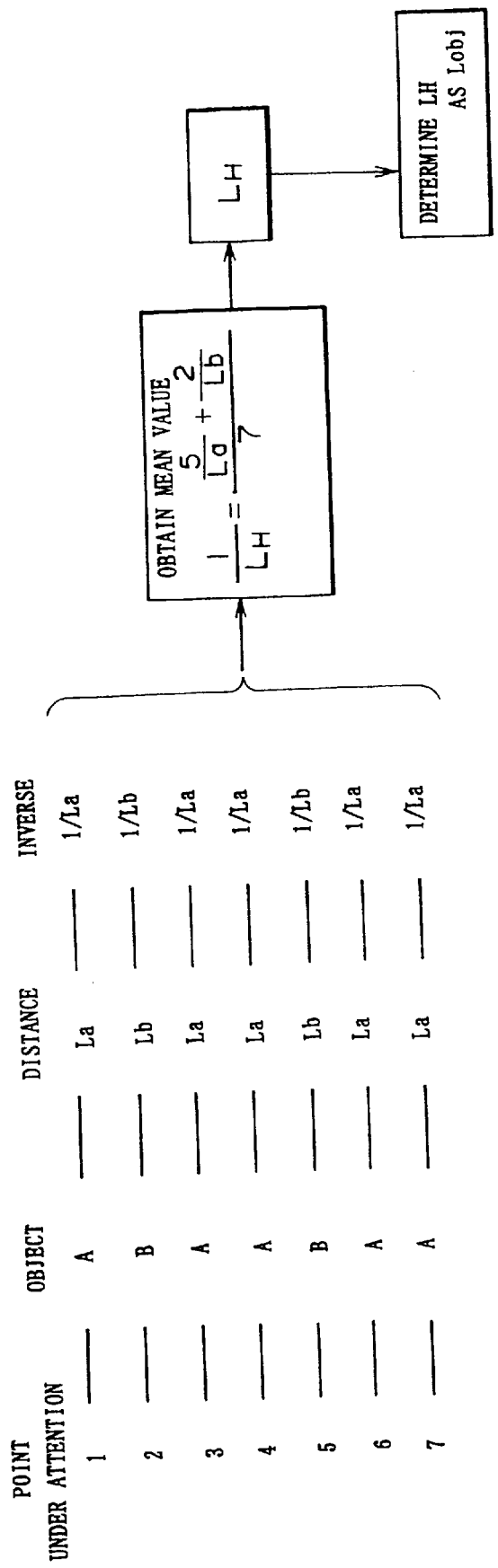
FIG. 31 is a schematic view referred to for describing a method for determining the distance of the object corresponding to each of the seven pints under attention, the inverses of these distances are averaged.

FIG. 31 is a schematic view referred to for describing a method, in which, after determining the distance of the object corresponding to each of the seven pints under attention as described before in connection with FIG. 28, the inverses of these distances are averaged to determine the distance of the object under attention.

More specifically, in this method, after determining the distance of the object corresponding to each of the points 1 to 7 under attention, the inverses of these distances are obtained. Then, based on the inverses thus obtained, the mean distance LH is computed in the illustrated manner, and outputted as the distance Lobj of the object under attention.

In this method, the mean distance can be obtained as an adequate finite value even when some objects are at infinite distance, for it is computed after obtaining the inverse of each distance.

Figure 32:
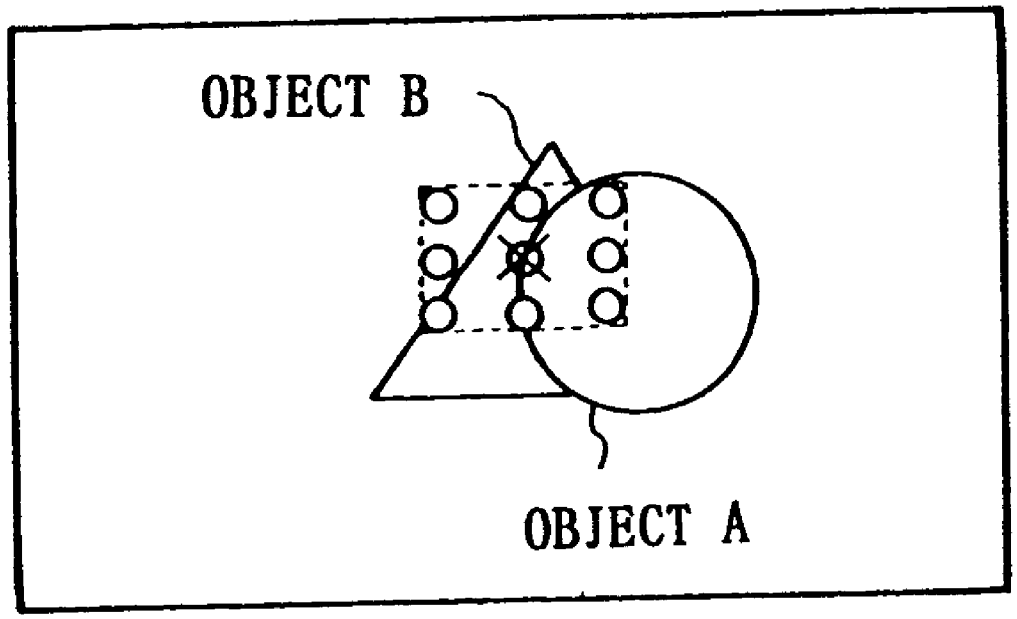
FIG. 32 is a schematic view referred to for describing a different process of discriminating the target object and determining the distance thereof in the distance determining system according to the present invention.

FIG. 32 is a schematic view referred to for describing a different process of discriminating the target object and determining the distance (Lobj as noted above) thereof in the distance determining system according to the present invention.

In the Figure, object A (i.e., a spherical body) and object B (i.e., a triangular pyramid body) are shown such that they are partly overlapped in their image projection on a certain plane. In this process, a predetermined number of (i.e., 9 in this example) sampling points (shown by circles) are set in a predetermined angle coverage centered on a point under attention (shown by cross), and the distance is determined by using data form these sampling points.

Figure 33:
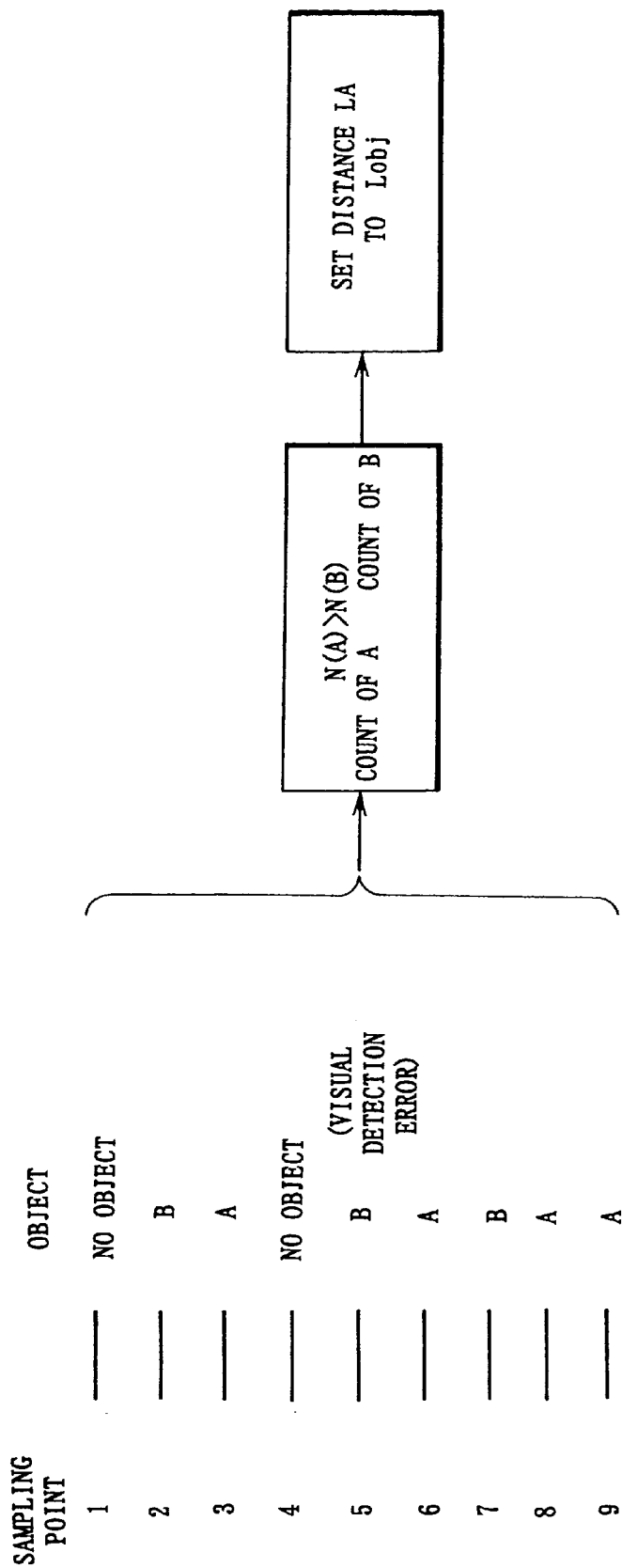
FIG. 33 is a schematic view referred to for describing how to determine the object under attention and the distance of the object according to data of the nine points under attention described before in connection with FIG. 32.

FIG. 33 is a schematic view referred to for describing how to determine the object under attention and the distance of the object according to data of the nine points under attention described before in connection with FIG. 32.

More specifically, in this method, each of the nine sampling points 1 to 9, as shown by circles in FIG. 32, is checked as to whether it belongs to the object A or B or does not belong to any object.

Then, the count (i.e., number) N (A) of sampling points belonging to the object A and the count N (B) of those belonging to the object B are determined.

The two counts N (A) and B (N) are then compared, and the object of the greater count (for instance the spherical body as the object A) is determined as the object under attention. Then, the distance LA of this object under attention is determined according to pertinent data that is held, and outputted as Lobj.

Figure 34:
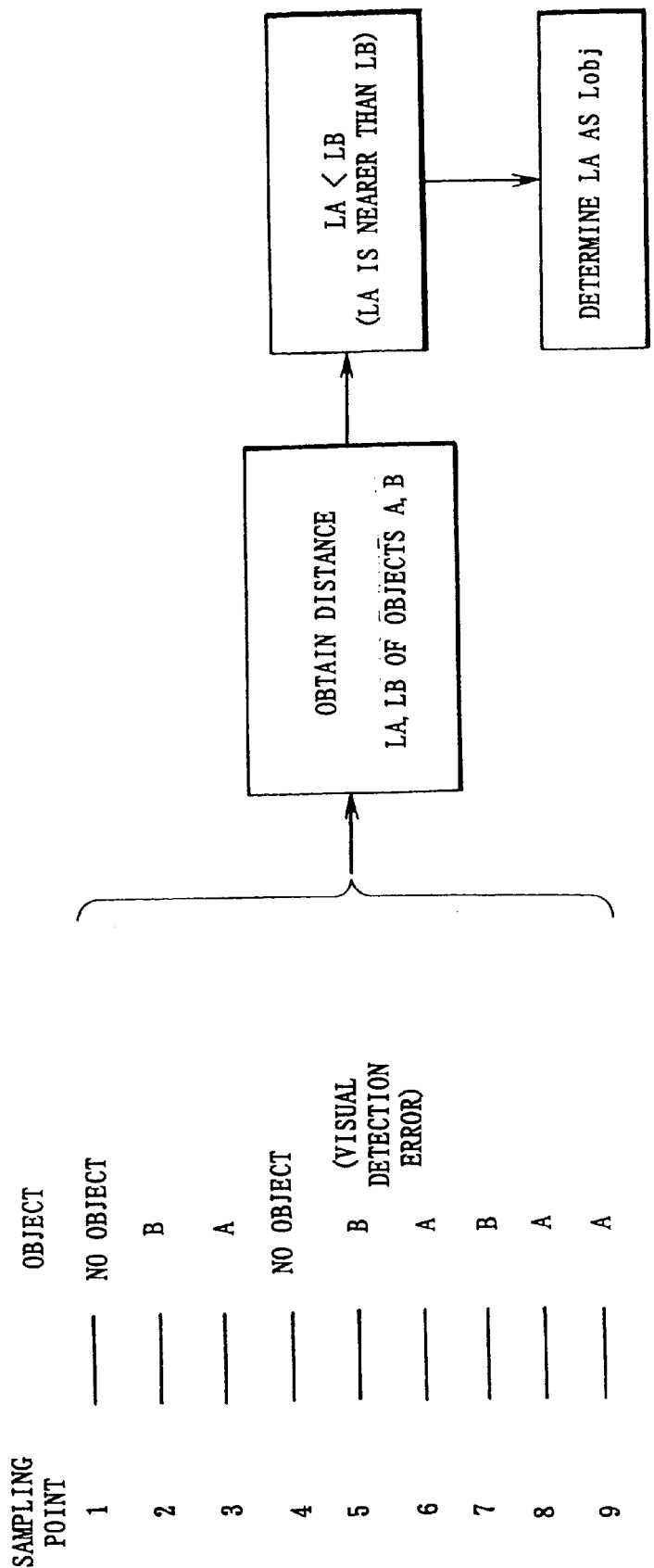
FIG. 34 is a schematic view referred to for describing a method for determining distance of the object corresponding to each of the nine points under attention, and the least distance.

FIG. 34 is a schematic view referred to for describing a method, in which the object corresponding to each of the nine points under attention, as described before in connection with FIG. 32, is first determined, then the distances of such objects are determined, and the least distance is determined as the distance of the object under attention.

More specifically, in this method, the object to which each of the nine sampling points 1 to 9 belongs to, is first discriminated. In this example, either the object A or the object B is discriminated.

Then, the distance of the discriminated object is determined according to pertinent image data that is held. The determined distances (LA and LB) are then compared, and the least one of them is determined and outputted as the distance of the object under attention. This method is based on the assumption that the viewer usually views the object at the least distance as the object under attention.

Figure 35:
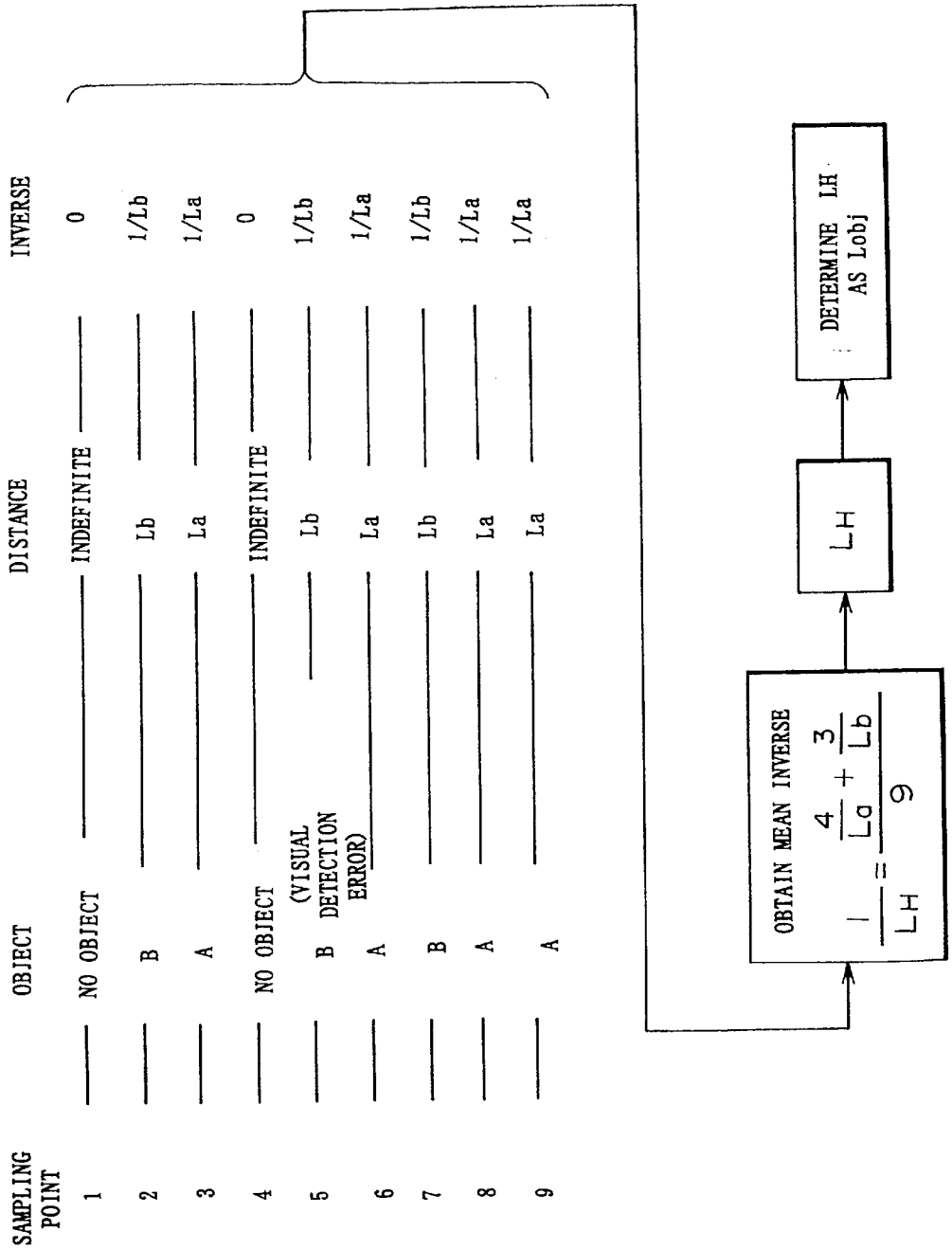
FIG. 35 is a schematic view referred to for describing a method for determining the distance of the object corresponding to each of the nine points under attention, averaging the inverses of these distances are averaged.

FIG. 35 is a schematic view referred to for describing a method, in which, after determining the distance of the object corresponding to each of the nine points under attention as described before in connection with FIG. 32, the inverses of these distances are averaged to determine the distance of the object under attention.

More specifically, in this method, each of the nine sampling points 1 to 9 is checked as to whether it belongs to the object A or B or does not belong to any object.

Then, the distance of the pertinent object is determined. Then, the inverses of these distances are determined. Then, based on the inverses thus obtained, the mean distance LH is computed in the illustrated manner.

This mean distance LH is outputted as the distance Lobj of the object under attention. In this method, the mean distance can be obtained as an adequate finite value even when some objects are at finite distance, for it is computed after obtaining the inverse of each distance.

A sixth embodiment of the present invention will now be described.

Figure 36:
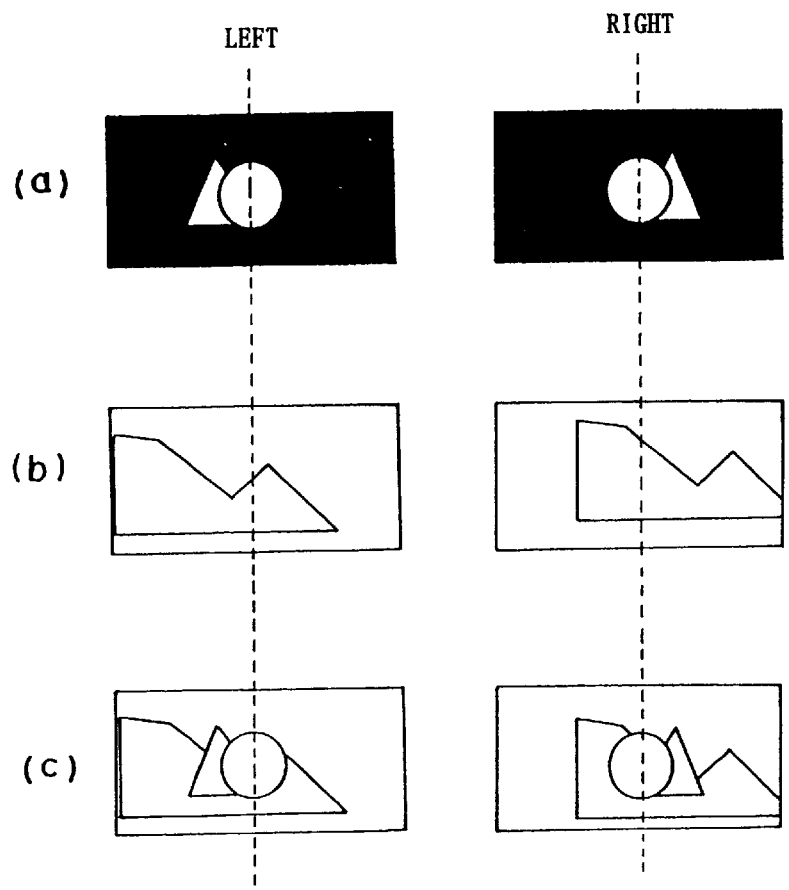
FIG. 36 is a schematic view showing the manner of combining background images with a suitable fixed parallax in the left and right images, for forming a stereo image in the apparatus according to the present invention, while optimizing the parallax particularly concerning the target object among two main displayed objects, by varying the state of display on the two screens as in the previous first and second embodiments.

FIG. 36 is a schematic view showing the manner of combining (or inserting) background images with a suitable fixed parallax in the left and right images, for forming a stereo image in the apparatus according to the present invention, while optimizing the parallax particularly concerning the target object among two main displayed objects (i.e., a triangular pyramid body and a spherical body), by varying the state of display on the two screens as in the previous first and second embodiments.

The process of inserting the background images in connection with FIG. 36, has already been described as "background insertion process" in connection with FIG. 1.

Shown in Part (a) in the Figure are the left and right images, when images due to rendering of only the triangular pyramid body as one displayed object and the other object (i.e., the spherical body as the object under attention) are displayed on the screens.

Shown in part (b) in the Figure are left and right background images, which are the same part of the original horizontal dimension area of the left and right screens, and cut out from the original area at different cut-out (or extraction) positions thereof.

Shown in part (c) in the Figure are the left and right images, each obtained after combining the background image with each Image of the two objects shown in part (a).

Figure 37:
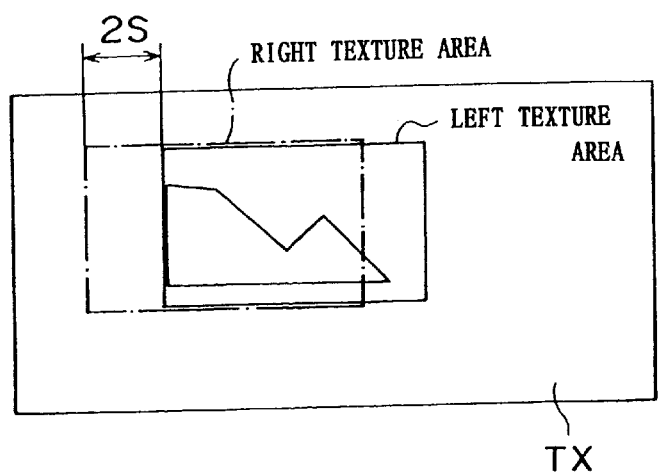
FIG. 37 illustrates how the left and right background images are obtained by cutting out the same area from the same original horizontal dimension image at different cut-out positions.

FIG. 37 illustrates how the left and right background images (or textures), described before in connection with part (b) in FIG. 36, are obtained by cutting out the same area from the same original horizontal dimension image (texture Tx) at different cut-out (or extraction) positions. The area shown enclosed in the solid rectangle (left texture area) is the background image for the left image. The area shown enclosed in the dashed rectangle (right texture area) is the background image for the right image. The two cut-out areas are shifted in position in the horizontal direction from each other by twice the distance S described before in connection with FIG. 23.

FIG. 38 is a schematic view showing a different manner of combining (or inserting) background images with a suitable fixed parallax in the left and right images, for forming a stereo image in the apparatus according to the present invention, while optimizing the parallax particularly concerning the target object among two main displayed objects (i.e., a triangular body and a spherical body), by varying the state of display on the two screens as in the previous first and second embodiments.

Again the process of inserting the background images in connection with FIG. 38, has already been described as "background insertion process" in connection with FIG. 1.

Shown in part (a) in the Figure are the left and right images, when images due to rendering of only the triangular pyramid body as one displayed object and the other object (i.e., the spherical body as the object under attention) are displayed on the screens.

Shown in part (b) in the Figure is that the background images for the left and right images (textures) are obtained by cutting out the same area form the same horizontal dimension image at the same cut-out position.

Shown in (c) in the Figure are the left and right images after inserting the background image in each of the images sown in part (a) each involving the two objects.

Shown in (d) in the Figure are the left and right images, each displayed together with a black frame on each of the left and right screens.

Shown in (e) in the Figure are the left and right images, which have been shifted together with their black frames by distance S away from each other to obtain an effect, which is equivalent to the shifting of the object and background images on the two screens away from each other.

As has been described in the foregoing, according to the present invention it is possible to construct, even by using a usual personal computer or the like, an apparatus, which permits delay-free control of parallax or vergent distance requiring relatively short computational time.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A stereo image forming apparatus, comprising:
an object selector constructed and arranged to select a particular object among the plurality of objects; and
a parallax controller constructed and arranged to keep constant the parallax of the first and second two-dimensional images of the selected particular object,
wherein said stereo image forming apparatus generates a first and a second piece of two-dimensional image data representing a first and a second two-dimensional image, respectively, of a plurality of stereo-modeled objects present in a virtual space,
the virtual space having three-dimensional coordinates set therein, determined by executing an operation corresponding to the projection of the objects on a first and a second predetermined projection plane from a first and second visual point at different coordinate positions in the virtual space with the three-dimensional coordinates set therein.

2. A stereo image forming apparatus according to claim 1, wherein the object selector comprises a visual direction detector which is constructed and arranged to detect a visual direction of a viewer viewing an image displayed on an image display and to select the particular object based on the detected output.

3. A stereo image forming apparatus according to claim 1, further comprising:

a head-mounted stereo image display comprising
a display element for the left eye,
a left eye optical system constructed and arranged to allow a user to view a screen of the display element for the left eye,
a display element for the right eye,
a right eye optical system constructed and arranged to allow a user to view a screen of the display element for the right eye, and
a support structure constructed and arranged to support the display elements and optical systems in a predetermined positional relationship to one another on a viewer's head,
image data obtained in the parallax controller being supplied as data representing images to be displayed on the two screens of the head-mounted stereo image display.

4. A stereo image forming apparatus according to claim 1, wherein the parallax controller comprises a visual line controller constructed and arranged to control a distance between a first point and a line connecting the first visual point and the second visual point, wherein the first point is defined as the intersection between a first line and a second line, the first line connecting the first visual point and a center of the first display element, the second line connecting the second visual point and a center of the second display element.

5. A stereo image forming apparatus according to claim 4, wherein the first projection plane is associated with the first visual point and the second projection plane is associated with the second visual point, and the visual line controller is constructed and arranged to rotate the projection planes around their associated visual points, whereby the visual line controller controls said distance.

6. A stereo image forming apparatus according to claim 4, wherein the visual line controller is constructed and arranged to shift at least one of the projection planes toward the other whereby the viual line controller controls said distance.

7. A stereo image forming apparatus, comprising:

an object selector constructed and arranged to select a particular object among the plurality of objects;
a parallax controller constructed and arranged to keep constant the parallax of the first and second two-dimensional images of the selected particular object,
a synthesis object image generator, constructed and arranged to generate a third two-dimensional image to be combined with the first two-dimensional image and a fourth two-dimensional image to be combined with the second two-dimensional image, both of the third and fourth two-dimensional images being produced from a single predetermined set of two-dimensional image data and incorporating a parallax controlled by the parallax control;
a first image synthesizer which generates two-dimensional image data representing a resultant two-dimensional image of the first and third two-dimensional images; and
a second image synthesizer which generates two-dimensional image data representing another resultant two-dimensional image of the second and fourth two-dimensional images,
wherein said stereo image forming apparatus generates a first and a second piece of two-dimensional image data representing a first and a second two-dimensional image, respectively, of a plurality of stereo-modeled objects present in a virtual space,
the virtual space having three-dimensional coordinates set therein, determined by executing an operation corresponding to the projection of the objects on a first and a second predetermined projection plane from a first and second visual point at different coordinate positions in the virtual space with the three-dimensional coordinates set therein.

8. A stereo image forming apparatus according to claim 4, further comprising:

the visual line controller controlling said distance such that said distance and a distance from the selected particular object to the second line are equal to each other, thereby obtaining distance controlled image data,
a stereo image display which controls a horizontal direction position relation between the two-dimensional images such as to reduce the parallax with respect to the particular object to zero, the stereo image display comprising
a left eye optical system constructed and arranged to allow viewing of a left eye screen,
a right eye optical system constructed and arranged to allow viewing of a right eye screen, and
the stereo image display being constructed such that the point of intersection between optical visual lines passing through principal points of lenses of the optical systems and centers of the screens, respectively, is in a virtual image plane provided by the optical systems, image data obtained in the two-dimensional image data control means being supplied as data representing images to be displayed on the screens, respectively, of the stereo image display.

9. A stereo image forming apparatus according to claim 1, wherein the visual line controller further comprises:

a two-dimensional image data controller, constructed and arranged to obtain two-dimensional image data by controlling, after execution of the operation corresponding to the projection in the stereo image forming apparatus, the horizontal direction position relation between a two-dimensional image displayed on a predetermined first image display area in stereo image display and a two-dimensional image displayed on a predetermined second image display area in the stereo image display using an object distance from the particular object to a line connecting the first and second visual points.

10. A stereo image forming apparatus, comprising: an object selector constructed and arranged to select a particular object among the plurality of objects;

a parallax controller constructed and arranged to keep constant the parallax of the first and second two-dimensional images of the selected particular object; and a stereo image display which is constructed and arranged to control the horizontal direction position relation between the two-dimensional images so as to reduce the parallax concerning the particular object to zero, the stereo image display comprising, a left eye optical system constructed and arranged to allow viewing of a left eye screen, a right eye optical system constructed and arranged to allow viewing of a right eye screen, and the stereo image display being constructed such that the point of intersection between optical visual lines passing through principal points of lenses of the optical systems and centers of the screens, respectively, is in a virtual image plane provided by the optical systems, image data obtained in the two-dimensional image data control means being supplied as data representing images to be displayed on the screens, respectively, of the stereo image display, wherein said stereo image forming apparatus generates a first and a second piece of two-dimensional image data representing a first and a second two-dimensional image, respectively, of a plurality of stereo-modeled objects present in a virtual space, the virtual space having three-dimensional coordinates set therein, determined by executing an operation corresponding to the projection of the objects on a first and a second predetermined projection plane from a first and second visual point at different coordinate positions in the virtual space with the three-dimensional coordinates set therein, wherein the visual line controller further comprises a two-dimensional image data controller, constructed and arranged to obtain two-dimensional image data by controlling, after execution of the operation corresponding to the projection in the stereo image forming apparatus, the horizontal direction position relation between a two-dimensional image displayed on a predetermined first image display area in stereo image display and a two-dimensional image displayed on a predetermined second image display area in the stereo image display using an object distance from the particular object to a line connecting the first and second visual points.

11. A stereo image forming apparatus comprising:

a stereo image data generator constructed and arranged to generate data representing a plurality of objects with different parallaxes;

an object selector constructed and arranged to select a particular object among the plurality of objects;

a parallax controller for image data such that the parallax of the entirety of the stereo image is controlled to make the parallax of the particular object to be zero; and a stereo image display comprising
a left eye optical system constructed and arranged to allow viewing of a left eye screen,
a right eye optical system constructed and arranged to allow viewing of a right eye screen, the stereo image display being constructed such that the point of intersection between visual lines passing through principal points of lenses of the optical systems and centers of the screens, respectively, is in a virtual image plane provided by the optical systems, wherein image data obtained in the parallax controller is supplied and is data representing images to be displayed on both the screens, respectively.

12. A stereo image forming apparatus comprising:

a stereo image data generator constructed and arranged to generate data representing a plurality of objects with different parallaxes;

an object selector constructed and arranged to select a particular object among the plurality of objects;

a parallax controller for image data such that the parallax of the entirety of the stereo image is controlled to make the parallax of the particular object to be zero;

a stereo image display comprising
a left eye optical system constructed and arranged to allow viewing of a left eye screen,
a right eye optical system constructed and arranged to allow viewing of a right eye screen, wherein image data obtained in the parallax controller is supplied as data representing images to be displayed on the screens, and the center positions of effective display areas of the screens are controlled such that the point of intersection between visual lines intersecting the optical systems is in a virtual image plane provided by the optical systems.

* * * * *